United States Patent
Sengupta et al.

(10) Patent No.: US 11,812,431 B2
(45) Date of Patent: Nov. 7, 2023

(54) METHODS AND APPARATUS FOR MONITORING DL COMMUNICATION WITH TIMING OFFSETS

(71) Applicant: QUALCOMM Incorporated, San Diego, CA (US)

(72) Inventors: Ayan Sengupta, San Diego, CA (US); Alberto Rico Alvarino, San Diego, CA (US); Xiao Feng Wang, San Diego, CA (US); Liangping Ma, San Diego, CA (US); Le Liu, Fremont, CA (US); Bharat Shrestha, San Diego, CA (US); Peter Gaal, San Diego, CA (US); Jun Ma, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 17/373,399

(22) Filed: Jul. 12, 2021

(65) Prior Publication Data
US 2022/0053531 A1     Feb. 17, 2022

Related U.S. Application Data

(60) Provisional application No. 63/064,410, filed on Aug. 12, 2020.

(51) Int. Cl.
*H04W 72/04*     (2023.01)
*H04W 72/1273*     (2023.01)
(Continued)

(52) U.S. Cl.
CPC ....... *H04W 72/1273* (2013.01); *H04L 1/1819* (2013.01); *H04L 1/1896* (2013.01);
(Continued)

(58) Field of Classification Search
CPC ......... H04W 72/1273; H04W 72/0446; H04W 72/21; H04W 84/06; H04W 56/0045;
(Continued)

(56) References Cited

U.S. PATENT DOCUMENTS 11,528,676 B2 * 12/2022 Medles ................. H04W 72/21
2011/0292854 A1 * 12/2011 Terry .................... H04L 5/0098
370/329
(Continued)

FOREIGN PATENT DOCUMENTS

WO     2019119411 A1    6/2019

OTHER PUBLICATIONS

3GPP TR 38.821 V1.0.0 (Dec. 2019)—3rd Generation Partnership Project; Technical Specification Group Radio Access Network; Solutions for NR to support non-terrestrial networks (NTN), (Release 16)—6.2 Physical layer control procedures 6.2.1 Timing relationships. (Year: 2019).*
(Continued)

*Primary Examiner* — Mahbubul Bar Chowdhury
(74) *Attorney, Agent, or Firm* — Procopio, Cory, Hargreaves & Savitch LLP

(57) ABSTRACT

The apparatus wireless communication may include a UE. The UE may receive a DL communication triggering a UL communication starting in a first UL slot/subframe from an NTN BS over at least one DL slot/subframe ending in a first DL slot/subframe. The UE may monitor for DL communications from the NTN BS in at least a subset of DL slots/subframes between the first DL slot/subframe and a second DL slot/subframe that is time-aligned with the first UL slot/subframe. The DL communication may trigger a second DL communication starting at a third DL slot/subframe and ending at a fourth DL slot/subframe, and the UL communication is based at least in part on receiving the
(Continued)

second DL communication, and the UE may monitor the at least the subset of slots/subframes between the fourth DL slot/subframe and the second DL slot/subframe.

30 Claims, 13 Drawing Sheets

(51) Int. Cl.
  *H04L 1/1812* (2023.01)
  *H04L 1/1867* (2023.01)
  *H04W 72/0446* (2023.01)
  *H04W 72/21* (2023.01)
  *H04W 84/06* (2009.01)

(52) U.S. Cl.
  CPC ....... *H04W 72/0446* (2013.01); *H04W 72/21* (2023.01); *H04W 84/06* (2013.01)

(58) Field of Classification Search
  CPC ... H04L 1/1819; H04L 1/1896; H04L 5/0091; H04L 5/0053; H04B 7/18504
  See application file for complete search history.

(56) References Cited

U.S. PATENT DOCUMENTS

| | | | |
|---|---|---|---|
| 2020/0092044 A1 | 3/2020 | Park et al. | |
| 2021/0105731 A1* | 4/2021 | Lin | H04W 72/1268 |
| 2021/0321353 A1* | 10/2021 | Muruganathan | H04L 1/1854 |
| 2022/0046679 A1* | 2/2022 | Yeo | H04W 56/0045 |
| 2022/0116968 A1* | 4/2022 | Choi | H04W 72/1268 |
| 2022/0191898 A1* | 6/2022 | Sergeev | H04W 74/0833 |
| 2022/0255682 A1* | 8/2022 | Gao | H04W 72/0446 |
| 2022/0295545 A1* | 9/2022 | Liu | H04W 56/0005 |
| 2022/0394650 A1* | 12/2022 | Wu | H04B 7/18513 |
| 2023/0019024 A1* | 1/2023 | Stare | H04W 72/23 |
| 2023/0095079 A1* | 3/2023 | Wu | H04W 56/0045 |
| | | | 370/350 |

OTHER PUBLICATIONS

CMCC: "Discussion on Timing Relationship Enhancements for NTN", 3GPP Draft, 3GPP TSG RAN WG1 #102-e, R1-2006210, 3rd Generation Partnership Project (3GPP), Mobile Competence Centre, 650, Route Des Lucioles, F-06921, Sophia-Antipolis Cedex, France, vol. RAN WG1, No. e-Meeting; Aug. 17, 2020-Aug. 28, 2020, Aug. 7, 2020 (Aug. 7, 2020), XP051915249, 6 pages, Retrieved from the Internet: URL: https://ftp.3gpp.org/tsg_ran/WG1_RL1/TSGR1_102-e/Docs/R1-2006210.zip R1-2006210.docx [retrieved on Aug. 7, 2020], the whole document.

International Search Report and Written Opinion—PCT/US2021/041468—ISA/EPO—dated Oct. 29, 2021.

Sony: "Discussion on Uplink Timing Advance and RACH Procedure", 3GPP Draft, 3GPP TSG RAN WG1 #98, R1-1908775, 3rd Generation Partnership Project (3GPP), vol. RAN WG1, No. Prague, CZ, Aug. 26, 2019-Aug. 30, 2019, Aug. 17, 2019 (Aug. 17, 2019), XP051765383, 4 Pages, Retrieved from the Internet: URL: http://www.3gpp.org/ftp/tsg_ran/WG1_RL1/TSGR1_98/Docs/R1-1908775.zip. [retrieved on Aug. 17, 2019] section 2, section 2.1, section 2.2, pp. 1-3, the whole document.

* cited by examiner

_US 11,812,431 B2_

METHODS AND APPARATUS FOR MONITORING DL COMMUNICATION WITH TIMING OFFSETS

CROSS REFERENCE TO RELATED APPLICATION(S)

This application claims the benefit of and priority to U.S. Provisional Application Ser. No. 63/064,410, entitled "METHOD AND APPARATUS FOR MONITORING DL COMMUNICATION WITH TIMING OFFSETS" and filed on Aug. 12, 2020, which is expressly incorporated by reference herein in its entirety.

TECHNICAL FIELD

The present disclosure relates generally to communication systems, and more particularly, to a method of wireless communication including a large timing advance.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus of wireless communication may include a base station and a user equipment (UE). The base station may include a non-terrestrial network (NTN) base station. The base station may schedule a downlink (DL) communication triggering an uplink (UL) communication starting in a first UL slot or subframe, and transmit the DL communication to the UE, over at least one DL slot or subframe ending in a first DL slot or subframe, the DL communication triggering the UL communication starting in the first UL slot or subframe, where the DL communication is transmitted in at least a subset of DL slots or subframes between the first DL slot or subframe and a second DL slot or subframe that is time-aligned with the first UL slot or subframe. The UE may receive the DL communication triggering the UL communication starting in the first UL slot/subframe from the NTN base station over at least one DL slot/subframe ending in the first DL slot/subframe. The UE may monitor for DL communications from the NTN BS in at least a subset of DL slots/subframes between the first DL slot/subframe and the second DL slot/subframe that is time-aligned with the first UL slot/subframe. The DL communication may trigger a second DL communication starting at a third DL slot/subframe and ending at a fourth DL slot/subframe, and the UL communication may be based at least in part on receiving the second DL communication, and the UE may monitor the at least the subset of slots/subframes between the fourth DL slot/subframe and the second DL slot/subframe.

The NTN BS may be configured to schedule DL transmission within slots/subframes that the UE is not configured to monitor due to the relatively large TA, and the UE may be scheduled, by the NTN BS, to receive DL transmission in the slots/subframes that the UE is not configured to monitor due to the relatively large TA. Accordingly, the NTN BS and the UE may improve the overall throughput of the system.

The DL communication triggering the UL communication may be a physical downlink control channel (PDCCH) triggering a physical uplink shared channel (PUSCH), a random access response (RAR) triggering the PUSCH, a PDCCH including a PDCCH order, triggering a physical random access channel (PRACH), or a PDCCH triggering uplink control information (UCI) over a physical uplink control channel (PUCCH) or over a PUSCH. The PDCCH may include downlink control information (DCI), the PDSCH may include data, and the PUCCH or PUSCH may include a hybrid automatic repeat request (HARD) Acknowledgment (ACK) (HARQ-ACK) based on the data.

In one example, the wireless communication may be a narrowband internet-of-things (NB-IoT) communication, and the PDCCH may be a narrowband PDCCH (NPDCCH), the PUSCH may be a narrowband PUSCH (NPUSCH), and the PRACH may be a narrowband PRACH (NPRACH). In another example, the wireless communication may be machine-type communication (MTC), and the PDCCH is an MTC PDCCH (MPDCCH).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
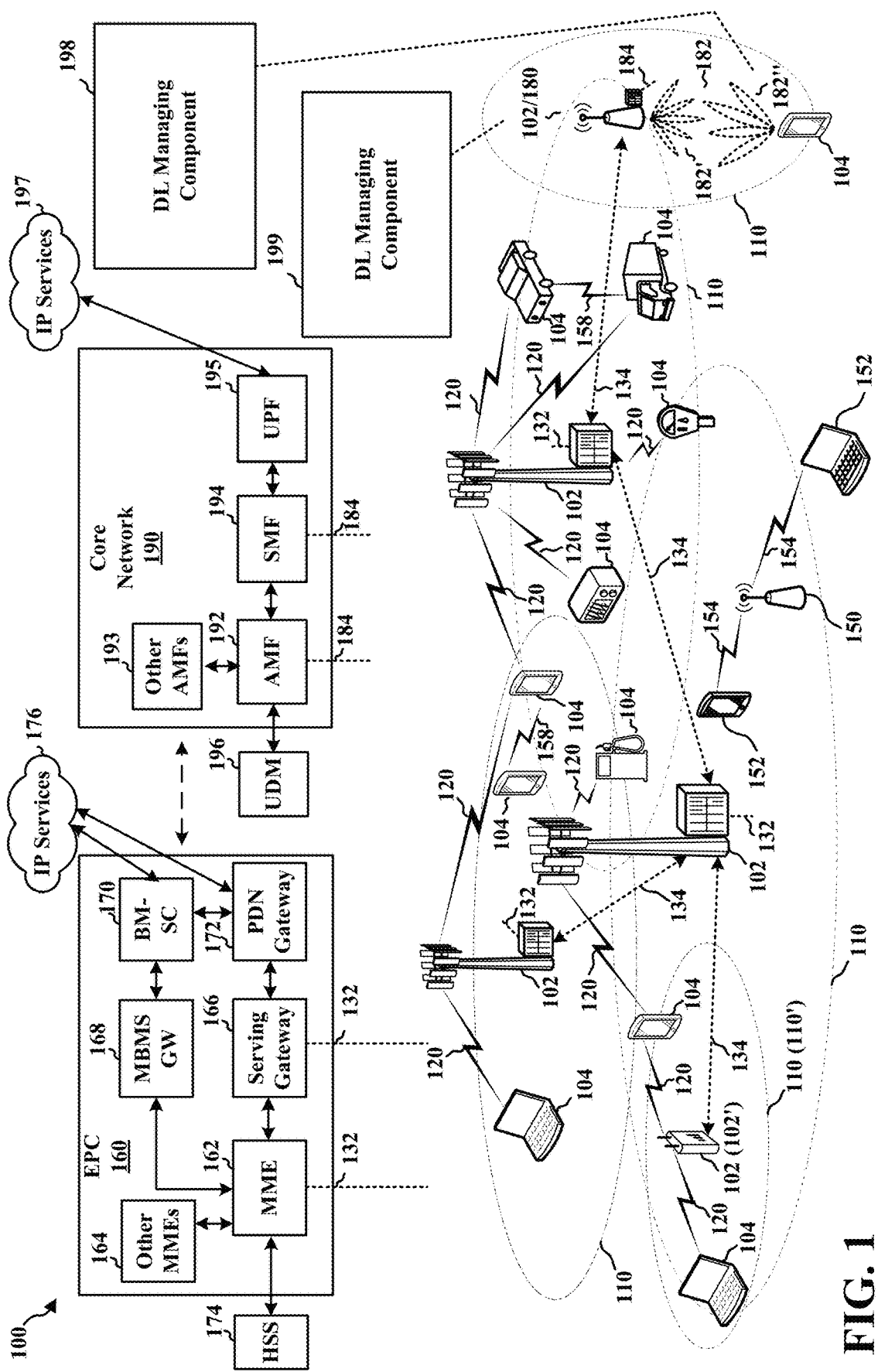
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessedby a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a DL managing component 198 configured to receive, from an NTN BS over at least one DL slot or subframe ending in a first DL slot or subframe, a DL communication triggering a UL communication starting in a first UL slot or subframe, and monitor for DL communications from the NTN BS in at least a subset of DL slots or subframes between the first DL slot or subframe and a second DL slot or subframe that is time-aligned with the first UL slot or subframe. In certain aspects, the base station 180 may include a DL managing component 199 configured to schedule a DL communication triggering a UL communication starting in a first UL slot or subframe, and transmit, to a UE over at least one DL slot or subframe ending in a first DL slot or subframe, the DL communication triggering the UL communication starting in the first UL slot or subframe, where the DL communication is transmitted in at least a subset of DL slots or subframes between the first DL slot or subframe and a second DL slot or subframe that is time-aligned with the first UL slot or subframe. Although the following description may be focused on 5G NR, the concepts described herein may be applicable to other similar areas, such as LTE, LTE-A, CDMA, GSM, and other wireless technologies.

Figure 2:
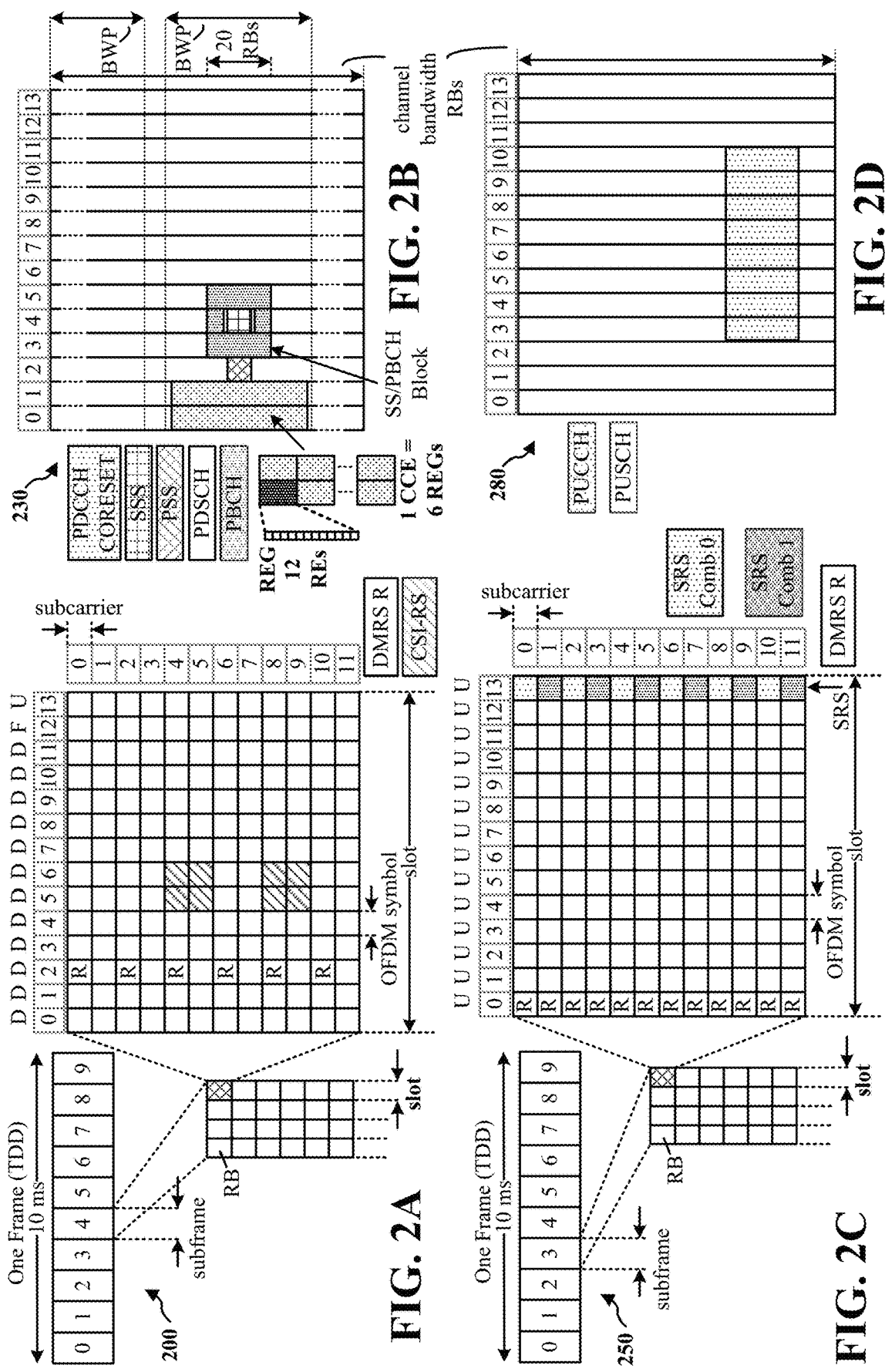
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
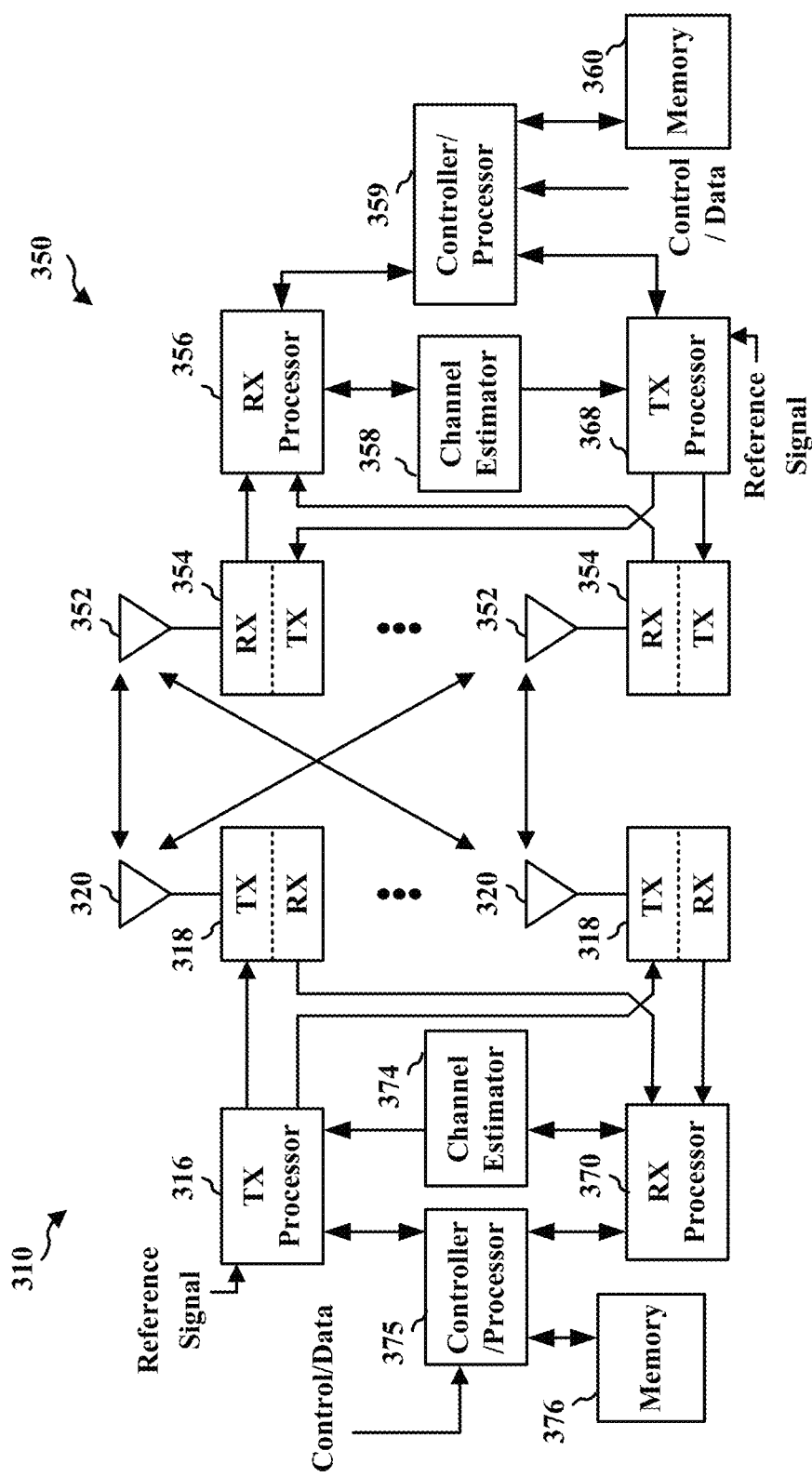
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects, a terrestrial network (TN) including a base station may indicate a timing advance, i.e., the misalignment in time between a UE's uplink frame and the UE's corresponding downlink frame, to the UE. For example, a TN base station may indicate the timing advance to the UE in a random access response message in response to a PRACH preamble transmission. In one aspect, the TN may have a relatively small timing advance, e.g., up to 1 millisecond. In another aspect, non-terrestrial networks (NTNs), such as satellite wireless network communication, may have relatively greater distance between the NTN base station (e.g., satellites) and the UEs, and have relatively greater signal propagation delay compared to the TN. Therefore, this may lead to very large timing advances. As a result, the NTN may reflect the impact of such large timing advances in the appropriate places wherever there is an uplink-downlink interaction in the timeline descriptions.

The uplink/downlink communication may be indexed by corresponding subframe/slot index. That is, an uplink transmission may be indexed by an uplink (UL) subframe/slot index, and a downlink transmission may be indexed by a downlink (DL) subframe/slot index. The index of the UL subframe/slot and the DL subframe/slot may be decided from the perspective of the UE.

Compared to the TN, the timing advance may be relatively large for the NTN, and the NTN system may be designed with an offset to compensate for the misalignment from the relatively large timing advance. For example, the offset may be based on the worst-case (or the largest) timing advance. Particularly, the offset $K_{offset}$ may be greater than the worst-case (or the largest) timing advance.

In some aspects, the NTN may signal a large value of the $K_{offset}$ corresponding to the Tx/Rx timelines for signals with a UL/DL interaction to cater to UEs with such large timing advances. For example, in a terrestrial network, a network may indicate to the UE to send its HARQ ACK in a UL slot/subframe N+K (where N is the last subframe/slot in which the corresponding PDSCH was sent). In the NTN with relatively larger timing advance, the network may indicate to the UE with a value N+K+$K_{offset}$, where the $K_{offset}$ would account for the round-trip time (RTT) for the UE (or, across several UEs) served by the NTN. That is, in a case when the NTN, e.g., an NTN with a relatively larger timing advance, transmits the DL transmission to a UE triggering the UE to transmit a UL transmission, the network may instruct the offset $K_{offset}$ to further offset the UL transmission to the UL slot/subframe N+K+$K_{offset}$ to send the corresponding UL transmission.

Figure 4:
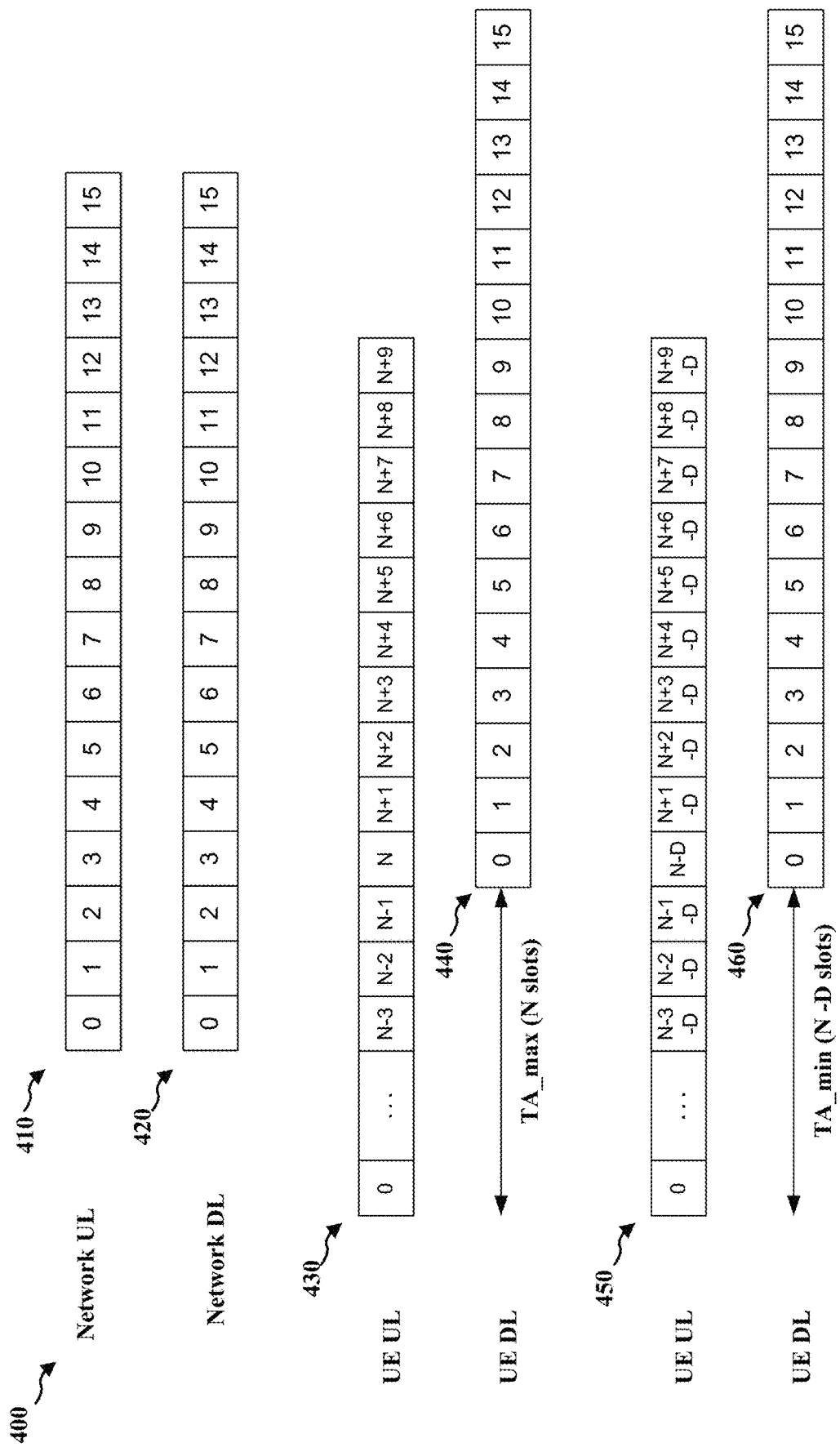
FIG. 4 illustrates DL/UL slot/subframe diagrams of a method of wireless communication.

Referring to FIG. 4, the offset $K_{offset}$ may be configured so that the scheduling is valid (i.e., if $K_{offset}$ is too small, a UE with a large TA cannot meet the necessary timeline in the UL transmission). That is, the network may determine the offset $K_{offset}$ is large enough based on the timing advance of the UE or the timing advances of the multiple UEs that are communicating with the network, so that the UE or the multiple UEs may meet the necessary scheduling timeline as instructed by the network.

FIG. 4 illustrates DL/UL slot/subframe diagrams 400 of a method of wireless communication. The DL/UL slot/subframe diagrams 400 may include a UL slot/subframe diagram 410 and a DL slot/subframe diagram 420 of the network, a UL slot/subframe diagram 430 and a DL slot/subframe diagram 440 of a first UE, and a UL slot/subframe diagram 450 and a DL slot/subframe diagram 460 of a second UE. The first UE may have the maximum TA of N slots/subframes, and the second UE may have the minimum TA of N-D slots/subframes.

The UL slot/subframe diagram 410 and the DL slot/subframe diagram 420 of the network shows that the UL and DL timing at the satellite/network may be assumed to be aligned with each other. As a result, for the first UE, the timing advance of N slots/subframes may imply that the UL transmission from the UE in the UE's UL slot/subframe N will reach the network at the network's slot N (DL/UL aligned) as well.

The network may also instruct the first UE and the second UE with the $K_{offset}$ to ensure that the UL transmission may not start before at least an offset equal to the timing advance with respect to the corresponding DL transmission. That is, if the first UE and the second UE are instructed to transmit the UL transmission before successfully completely processing the corresponding UL transmission, the scheduling timeline may become invalid. In one aspect, for the first UE, the DL transmission received in slot 0 of the first UE DL slot/subframe diagram 440, which is time-aligned with the slot N of the first UE UL slot/subframe diagram 430, may not trigger the first UE to be scheduled with the UL transmission that corresponds to the received DL transmission, before the slot N of the first UE UL slot/subframe diagram 430. In another aspect, for the second UE, the DL transmission received in slot 0 of the second UE DL slot/subframe diagram 460, which is time-aligned with the slot N of the second UE UL slot/subframe diagram 450, may not trigger the second UE to schedule the UL transmission that corresponds to the received DL transmission, before the slot N-D of the second UE UL slot/subframe diagram 450.

A slot/subframe time-aligned to another slot may refer to a slot/subframe that is the closest to another slot/subframe in time. For example, a first slot/subframe time-aligned with a second slot/subframe may include the first slot/subframe with a fractional slot/subframe misalignments that may be appropriately rounded up or down to be time-aligned with the second slot/subframe.

In one aspect, for some aspects of the TN, certain half-duplex UEs (e.g., NB-IoT UEs that may also have some processing constraints) may not be expected to monitor for certain DL communications (e.g., another NPDCCH) in a time period after receiving a DL communication (e.g., NPDCCH/RAR that schedules NPUSCH; NPDSCH;

NPDCCH order that schedules NPRACH, etc.) and before transmitting the corresponding UL transmissions (e.g., corresponding NPUSCH; HARQ ACK; NPRACH, etc.). In another aspect, for some aspects of the NTN, the NTN may suffer a throughput loss if the certain half-duplex UEs are configured not to monitor for certain DL communications in a time period after receiving the DL communication and before transmitting the corresponding UL transmissions, due to the relatively larger timing offsets that may exist in an NTN, e.g., due to a common scheduling offset ($K_{offset}$) configured for a group of UEs being served by the NTN, where the $K_{offset}$ may cater to the worst-case (or the largest) round-trip time (RTT) of the UEs within the group.

Figure 5:
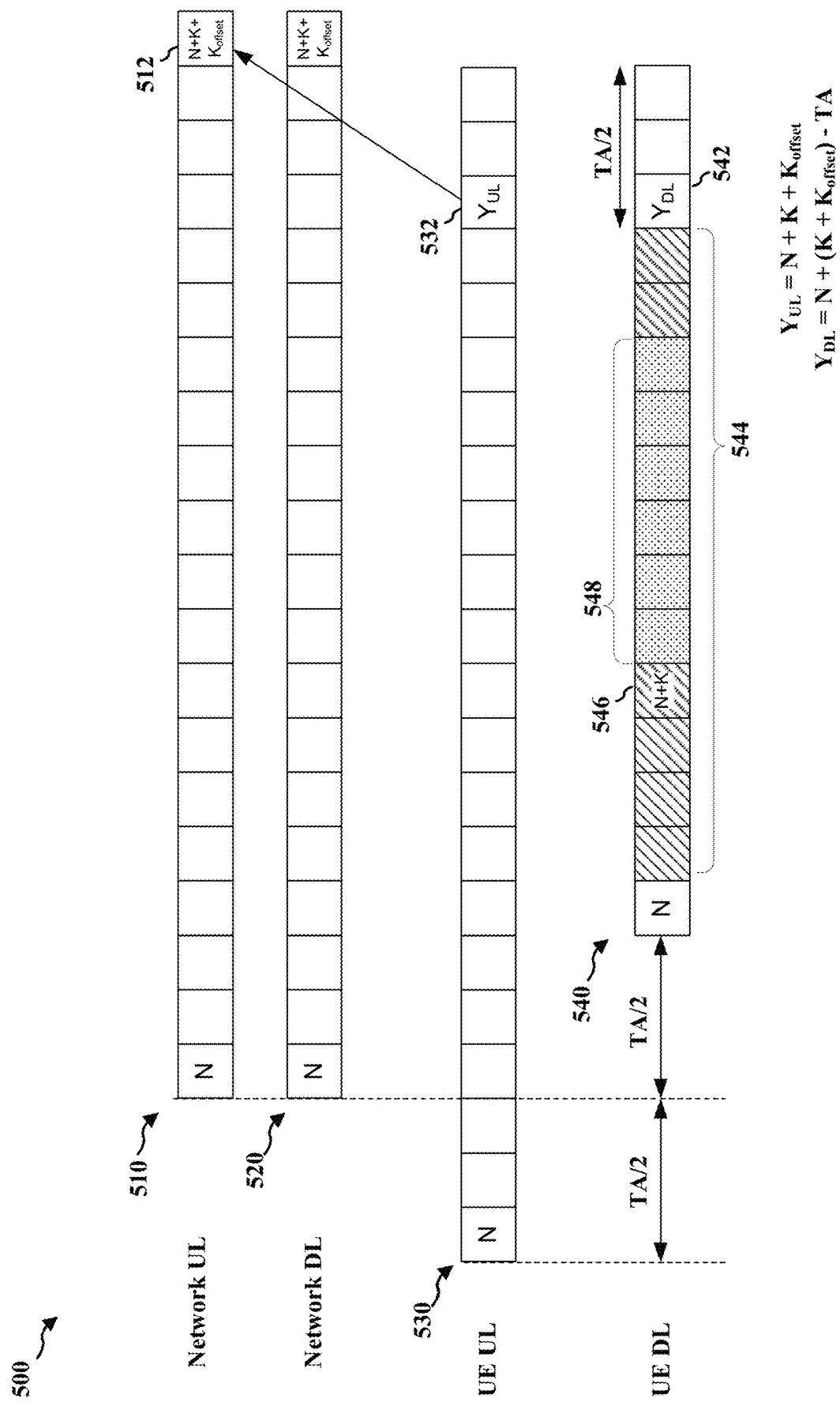
FIG. 5 illustrates DL/UL slot/subframe diagrams of a method of wireless communication.

FIG. 5 illustrates DL/UL slot/subframe diagrams 500 of a method of a wireless communication. The DL/UL slot/subframe diagrams 500 include a UL slot/subframe diagram 510 and a DL slot/subframe diagram 520 of the network, and a UL slot/subframe diagram 530 and a DL slot/subframe diagram 540 of a UE.

Here, the UE may receive the DL communication ending in the DL slot/subframe N of the DL slot/subframe diagram 540 of a UE, triggering the UE to transmit the corresponding UL transmission in the UL slot/subframe, i.e., $Y_{UL}$ 532, with an index N+K+$K_{offset}$, which is time-aligned with the DL slot/subframe, i.e., $Y_{DL}$ 542, having an index of N+(K+$K_{offset}$)−TA. Accordingly, from the network side, the network may receive the UL transmission ins the UL slot/subframe 512 having an index of N+K+$K_{offset}$.

In some aspects, for the TN, an NB-IoT UE may detect an NPDCCH with a DCI Format N0 ending in a slot/subframe N or receive an NPDSCH carrying a random access response (RAR) grant ending in the slot/subframe N, and the detected NPDDCH or the received NPDSCH may instruct the NB-IoT to start the transmission of the corresponding NPUSCH format 1 from a slot/subframe N+K, the UE may not be scheduled to monitor for another NPDCCH in any slot/subframe starting from the slot/subframe N+1 to the slot/subframe N+K−1. For TN UEs, the values of slots/subframes K may be relatively small (e.g., a few slots/subframes), mainly to give enough time to the UE (e.g., with limited processing capabilities) to complete its processing of the DL transmission. Note that, for the TN, there is no existence of the $K_{offset}$ term, i.e., $K_{offset}$=0, for the TN. In this setting, the time that the UE is "waiting to transmit" the corresponding uplink transmission may be represented by K.

For the NTN, however, the $K_{offset}$ may be configured by the NTN to cater for the worst-case (or the largest) timing advance across multiple UEs in the NTN cell. In such a case, a UE with a small timing advance (e.g., a UE positioned near the NTN) may need to be "waiting to transmit" the uplink until the scheduled UL time, which may be based on the $K_{offset}$. Therefore, when communicating with the NTN, the "not expected to monitor DL" condition may be modified for the UE during at least a part of such "waiting time," so that the UE may be scheduled to receive DL transmission in such a part, thereby improving the overall throughput of the system. For example, a UE may be configured to monitor the DL (e.g., NPDCCH) during at least a part of this time period.

For NTN, as described before, the specifications above and in all such instances of a UL triggered by a DL would be updated to say that the "corresponding NPUSCH format 1 transmission starts from N+K+$K_{offset}$." That is, for the NTN, an NB-IoT UE may detect an NPDCCH with a DCI Format N0 ending in a slot/subframe N or receive an NPDSCH carrying a random access response (RAR) grant ending in the slot/subframe N, and the detected NPDDCH or the received NPDSCH may instruct the NB-IoT to start the transmission of the corresponding NPUSCH format 1 from a slot/subframe N+K+$K_{offset}$.

If the NTN NB-IoT UE follows the behavior of the TN NB-IoT UE, the NTN NB-IoT UE may not be scheduled to monitor another NPDCCH in any slot/subframe 544, starting from the slot/subframe N+1 to the slot/subframe N+K+Koffset−$n_{TA}^{UE}$−1. Here, $n_{TA}^{UE}$ may refer to a number of slots/subframes of the timing advance of the UE. In other words, $n_{TA}^{UE}$ may refer to TA. Therefore, the waiting period between the slot/subframe N+1 to the slot/subframe N+K+Koffset−$n_{TA}^{UE}$−1 for a near UE (e.g., one that is closer to a satellite of the NTN) with relatively smaller $n_{TA}^{UE}$ may be very large. Accordingly, the UE may be configured to monitor for the NPDCCH in at least a part of the waiting time from the slot/subframe N+1 to the slot/subframe N+K+Koffset−$n_{TA}^{UE}$−1. For example, the UE may be configured to monitor another NPDCCH in the slots/subframes 548 after the slot/subframe N+K 546, between the slot/subframe N+K+1 to the slot/subframe N+K+$K_{offset}$−TA−3.

In one aspect, the DL/UL slot/subframe diagrams 500 may refer to a NPUSCH timeline for a multi transmission block scheduling or a twoHARQ-ProcessesConfig in NTN. For the TN, for a NPDCCH UE-specific search space, an NB-IoT UE may be configured with a higher layer parameter twoHARQ-ProcessesConfig or npusch-MultiTB-Config. The NB-IoT UE may detect the NPDCCH with DCI Format N0 ending in a slot/subframe N of the DL slot/subframe diagram of the UE, and the corresponding NPUSCH format 1 transmission may start from a slot/subframe N+K. If the corresponding NPDCCH with DCI format N0 with CRC scrambled by C-RNTI schedules two transport blocks as determined by the number of scheduled TB field if present, the UE is not specified to monitor an NPDCCH candidate in any subframe starting from the slot/subframe N+1 to the slot/subframe N+K−1, otherwise the UE is not specified to monitor an NPDCCH candidate in any subframe starting from the slot/subframe N+K−2 to the slot/subframe N+K−1.

Referring to FIG. 5, for the NTN with the $K_{offset}$, the NB-IoT UE may detect the NPDCCH with DCI Format N0 ending in a slot/subframe N of the DL slot/subframe diagram 540 of the UE, and the corresponding NPUSCH format 1 transmission may start from a UL slot/subframe $Y_{UL}$ 532 time-aligned with the DL slot-subframe $Y_{DL}$ 542. If the corresponding NPDCCH with DCI format N0 with CRC scrambled by C-RNTI schedules two transport blocks as determined by the number of scheduled TB field if present, if similar behaviour as the TN is maintained, the UE is not specified to monitor an NPDCCH candidate in any subframe starting from the slot/subframe N+1 to the slot/subframe N+K+$K_{offset}$−1, otherwise the UE is not specified to monitor an NPDCCH candidate in any subframe starting from the slot/subframe N+K−2 to the slot/subframe N+K+$K_{offset}$−1. In some aspects of this disclosure, the UE may be further specified to monitor at least a subset of the above slots/subframes in which the UE is not specified to monitor an NPDCCH corresponding to UE behaviour in a TN. For example, the UE may be scheduled to monitor for an NPDCCH candidate in the slots/subframes 548 after the slot/subframe N+K 546, between the slot/subframe N+K+1 to the slot/subframe N+K+$K_{offset}$−TA−3.

In another aspect, the DL/UL slot/subframe diagrams 500 may refer to a PDCCH order triggering an NPRACH transmission. For the TN, a NB-IoT UE may detect an NPDCCH with a DCI Format N1 for a PDCCH order ending in subframe N. If the NPDCCH instructs the UE to start the transmission of the corresponding NPRACH transmission from the subframe N+K, the UE may not be scheduled to monitor for another NPDCCH in any subframe starting from the slot/subframe N+1 to the slot/subframe N+K−1.

Referring to FIG. 5, for the NTN with the $K_{offset}$, the NB-IoT UE may detect the NPDCCH with the DCI Format N1 for the PDCCH order ending in the subframe N of the DL slot/subframe diagram 540 of the UE. If the NPDCCH instructs the UE to start the transmission of the corresponding NPRACH transmission from the subframe N+K+$K_{offset}$, if similar behaviour as the TN is maintained, the UE may not be scheduled to monitor for another NPDCCH in any subframe 544 starting from the slot/subframe N+1 to the slot/subframe N+K+$K_{offset}$−1. In some aspects of this disclosure, the UE may be scheduled to monitor at least a subset of the above slots/subframes in which the UE is not specified to monitor an NPDCCH corresponding to UE behaviour in a TN. For example, the UE may be further specified to monitor for an NPDCCH candidate in the slots/subframes 548 after the slot/subframe N+K 546, between the slot/subframe N+K+1 to the slot/subframe N+K±$K_{offset}$−TA−3.

Figure 6:
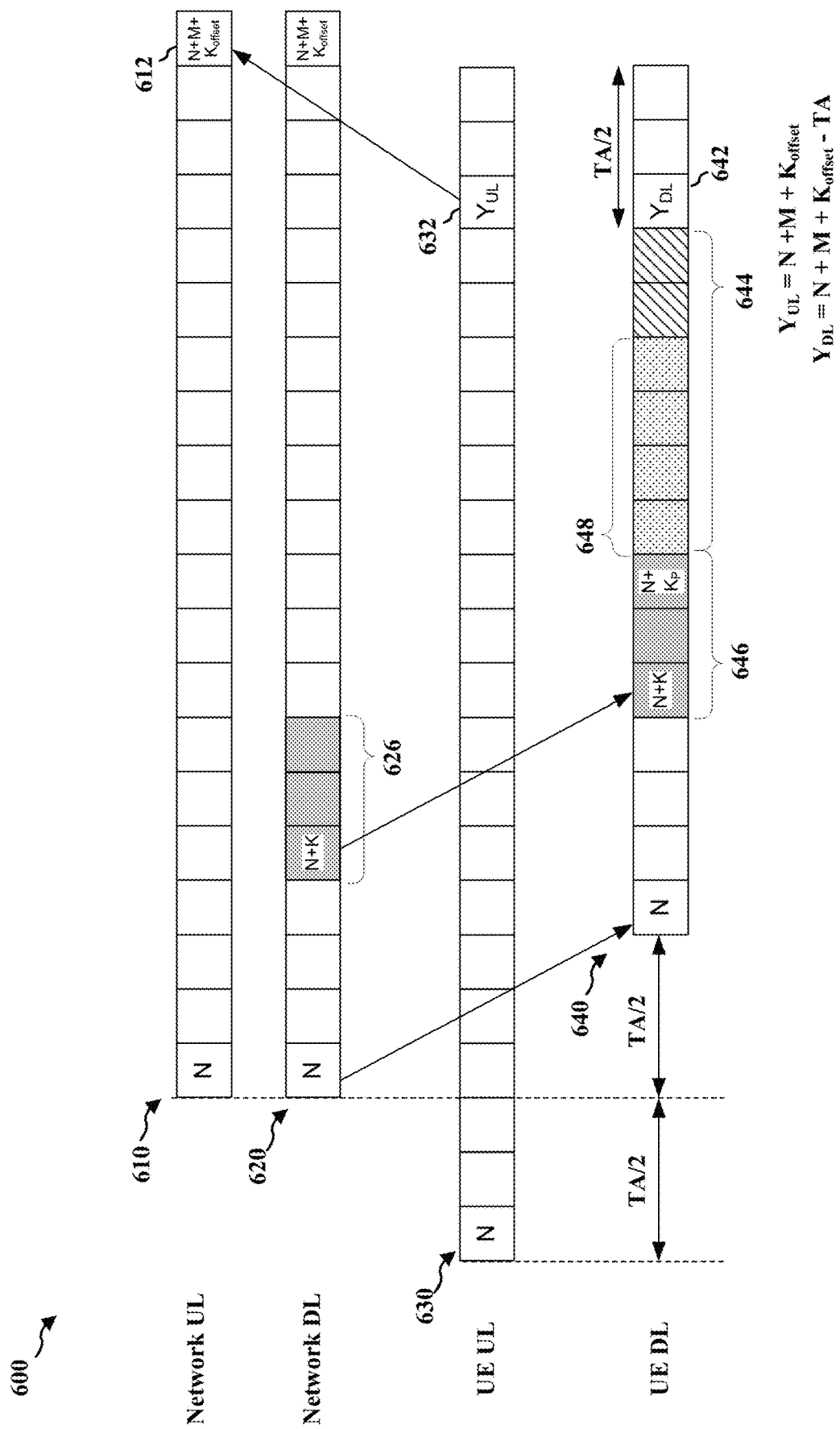
FIG. 6 illustrates DL/UL slot/subframe diagrams of a method of wireless communication.

FIG. 6 illustrates DL/UL slot/subframe diagrams 600 of a method of a wireless communication. The DL/UL slot/subframe diagrams 600 include a UL slot/subframe diagram 610 and a DL slot/subframe diagram 620 of the network, and a UL slot/subframe diagram 630 and a DL slot/subframe diagram 640 of a UE. Compared to the DL/UL slot/subframe diagrams 500 of FIG. 5, the DL communication received at the slot/subframe N of the DL slot/subframe diagram 640 of the UE may instruct the UE to receive the DL transmissions in the slots/subframes 646, the slots/subframes 646 starting from the slot/subframe N+K of the of the DL slot/subframe diagram 640 of the UE to trigger the UL transmission in the UL slot/subframe, i.e., $Y_{UL}$ 632, with an index N+M+$K_{offset}$, which is time-aligned with the DL slot/subframe, i.e., $Y_{DL}$ 642, having an index of N+(M+$K_{offset}$)−TA. The DL transmissions in the slots/subframes 646 corresponds with the DL transmissions in the slots/subframes 626 of the DL slot/subframe diagram 620 of the network. Accordingly, from the network side, the network may receive the UL transmission starting in the UL slot/subframe 612 having an index of N+M+$K_{offset}$.

In one aspect, for the TN, an NB-IoT UE may detect the NPDCCH with the DCI Format N1 ending in the slot/subframe N, and if the corresponding NPDSCH transmission starts from N+K, and the corresponding NPUSCH format 2 transmission may start from the subframe N+M. The UE is not specified to monitor for another NPDCCH in any subframe starting from subframe N+K_P to subframe N+M−1. Note that, for the TN, there is no existence of the $K_{offset}$ term—i.e., $K_{offset}$=0, for the TN.

Referring to FIG. 6, for the NTN with the $K_{offset}$, the NB-IoT UE may detect the NPDCCH with the DCI Format N1 ending in the slot/subframe N, and the NPUSCH format 2 (HARQ ACK) transmission may start from the subframe N+M+$K_{offset}$. If similar UE behaviour as in the TN is to be followed, the UE is not specified to monitor for another NPDCCH in any subframe starting from subframe N+K_P to subframe N+M±$K_{offset}$−1−TA. In some aspects of this disclosure, the UE may be scheduled to monitor at least a subset of the above slots/subframes in which the UE is not specified to monitor an NPDCCH. For example, the UE may be further specified to monitor for an NPDCCH candidate in the slots/subframes 648 of any slot/subframe 644 after the DL transmission in the slots/subframes 646, between the DL slot/subframe N+K_P+1 to the slot/subframe N+M+$K_{offset}$−TA−3.

Accordingly, referring again to FIGS. 5 and 6, the UE in NTN with the relatively large timing advance and the $K_{offset}$ may be scheduled to monitor for another DL transmission during at least a part of the time that the UE may be waiting to transmit the UL transmission, to reduce loss of throughput in the NTN. The UE may, for the TN without the $K_{offset}$, not be scheduled to monitor for another DL transmission during the time that the UE may be waiting to transmit the UE transmission. For example, the UE may determine a first configuration for the monitoring of the DL communications from the NTN, the first configuration indicating at least the subset of the DL slots/subframes for the monitoring, and determine a second configuration for the monitoring of the DL communications from the TN, the second configuration being different from the first configuration. In other words, the second configuration may indicate a different subset of the DL slots/subframes for the monitoring. Particularly, the different subset may be a zero subset, and the second configuration may indicate that none of the subset of the DL slots/subframes are specified to be monitored by the UE.

The UE may store the UL communications in the UL transmission buffer, and monitor for the DL communication during at least a part of this "waiting time." If the UE detects and receives another DL communication from the NTN, the UE may process the newly received DL communication, while the previous UL communication stored in the UL transmission buffer may be timely transmitted to the NTN. Accordingly, the UE in NTN may reduce the throughput loss from the relatively large timing advance and $K_{offset}$.

In one aspect, the NB-IoT UE may be configured to communicate with the BS without receiving a feedback for the UL transmission. In a feedback driven processes, a DCI corresponding to a single HARQ process may, implicitly (via a toggled new data indicator (NDI) bit in the DCI) or explicitly, provide the HARQ feedback (HARQ ACK/NACK) for the UL transmission by the NB-IoT UE, and the NB-IoT UE may not transmit another PUSCH over the single HARQ process until the NB-IoT UE receives the HARQ feedback from the B S. Accordingly, the NB-IoT UE may not need to monitor for another DCI corresponding to the single HARQ process in the "waiting time." For example, the NB-IoT may receive a NPDCCH triggering the NB-IoT to transmit a NPUSCH to the BS on the single HARQ process. The NB-IoT UE may transmit the PUSCH to the BS and the BS may transmit the HARQ feedback implicitly or explicitly on the DL transmission. Upon successful reception of the NPUSCH, the BS may transmit the (implicit or explicit) HARQ-ACK to the NB-IoT UE to trigger next transmission of NPUSCH over the single HARQ process. The BS feedback may be implicit—i.e., the BS may provide feedback by flipping a new data indicator (NDI) bit indicating a new data transmission for NPUSCH over the single HARQ process in the DCI transmitted to the NB-IoT UE. The NB-IoT UE may receive the DCI indicating the implicit HARQ-ACK and confirm that the NPUSCH was successfully transmitted to the BS. To maintain the correspondence within the single HARQ process, the NB-IoT UE may not monitor for another PDCCH from the BS during the "waiting time."

In a feedback-less process, the NB-IoT UE may transmit NPUSCH in a HARQ process without first receiving a HARQ feedback (HARQ-ACK/NACK) from the B S. In such case, the NB-IoT UE may transmit the NPUSCH to the BS, and since the NB-IoT is not expecting a feedback from the BS, the NB-IoT may also monitor for another DL communication triggering the next UL communication during the "waiting time" of the same HARQ process.

Figure 7:
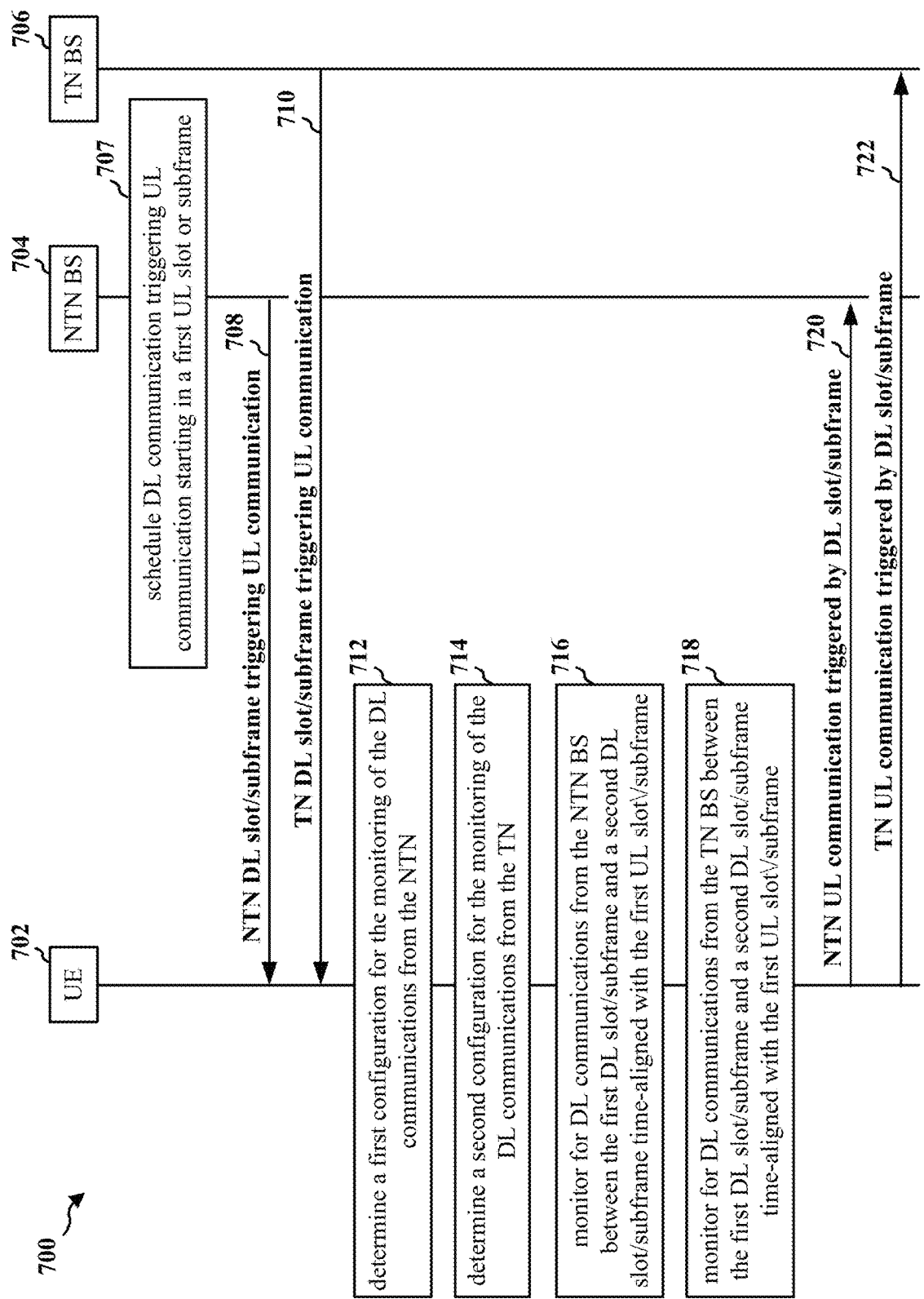
FIG. 7 is a communication diagram of a method of wireless communication.

FIG. 7 is a communication diagram 700 of a method of wireless communication. The wireless communication may include a UE 702, an NTN BS 704, and a TN BS 706. In some aspects, the NTN BS 704 may be configured to schedule DL transmission within slots/subframes that the UE 702 is not configured to monitor due to the relatively large TA, and the UE 702 may be scheduled, by the NTN BS 704, to receive DL transmission in the slots/subframes that the UE 702 is not configured to monitor due to the relatively large TA. Accordingly, the NTN BS 704 and the UE 702 may improve the overall throughput of the system.

At 707, the NTN BS 704 may schedule a DL communication triggering a UL communication starting in a first UL slot or subframe. At 708, the NTN BS 704 may transmit, to the UE 702, over at least one DL slot or subframe ending in a first DL slot or subframe, the DL communication triggering the UL communication starting in the first UL slot or subframe. The UE 702 may receive a DL communication triggering a UL communication starting in a first UL slot/subframe from the NTN BS 704 over DL slot/subframe ending in a first DL slot/subframe. Referring to FIGS. 5 and 6, the first UL slot/subframe may refer to the UL slot/subframe $Y_{UL}$ 532 and 632, which are timely aligned with the DL slot-subframe $Y_{DL}$ 542 and 642, respectively, and the first DL slot/subframe may refer to the DL slot/subframe N of the DL slot/subframe diagram 540 and 640.

At 710, the UE 702 may receive a DL communication triggering a UL communication starting in a first UL slot/subframe from the TN BS 706 over DL slot/subframe ending in a first DL slot/subframe.

The DL communications triggering the UL communication may include a PDCCH triggering a PUSCH, an RAR triggering the PUSCH, a PDCCH including a PDCCH order triggering a PRACH, or a PDCCH triggering a UCI over a PUCCH or a PUSCH. The PDCCH may include a DCI, the PDSCH may include data, and the PUCCH or PUSCH may include a HARQ-ACK based on the data.

In one aspect, the wireless communication may be an NB-IoT communication, and the PDCCH may be an NPDCCH, the PUSCH may be an NPUSCH, and the PRACH may be an NPRACH. In another aspect, the wireless communication may be MTC, and the PDCCH may be an MPDCCH.

At 712, the UE 702 may determine a first configuration for the monitoring of the DL communications from the NTN BS 704, the first configuration indicating at least the subset of the DL slots/subframes for the monitoring. Referring to FIGS. 5 and 6, the subset of the DL slots/subframes may refer to the DL slots/subframes 548 and 648.

In one aspect, the DL communication may trigger a second DL communication starting at a third DL slot/subframe and ending at a fourth DL slot/subframe, and the UL communication may be based at least in part on receiving the second DL communication. In such case, the subset of slots/subframes may be monitored between the fourth DL slot/subframe and the second DL slot/subframe. Referring again to FIG. 6, the third DL slot/subframe and the fourth DL slot/subframe may respectively refer to the DL slot/subframe N+K and N+M of the slots/subframes 646.

At 714, the UE 702 may determine a second configuration for the monitoring of the DL communications from the TN BS 706, the second configuration being different from the first configuration. In one aspect, the second configuration may indicate a zero subset of the DL slots/subframes for monitoring.

At 716, the UE 702 may monitor for the DL communications from the NTN BS 704 in a subset of the DL slots/subframes between the first DL slot/subframe and the second DL slot/subframe that is time-aligned with the first UL slot/subframe, based on the first configuration for the monitoring of the DL communications from the NTN BS 706.

At 718, the UE 702 may monitor for the DL communications from the TN BS 706 in a subset of the DL slots/subframes between the first DL slot/subframe and the second DL slot/subframe that is time-aligned with the first UL slot/subframe, based on the second configuration for the monitoring of the DL communications from the TN BS 706. In case the second configuration indicates the zero subset of the DL slots/subframes for monitoring, the UE 702 does not monitor any DL slots/subframes between the first DL slot/subframe and the second DL slot/subframe that is time-aligned with the first UL slot/subframe.

At 720, the UE 702 may transmit the UL communication triggered by the DL slot/subframe received at 708. The NTN BS 704 may receive the UL communication triggered by the DL slot/subframe transmitted at 708. At 722, the UE 702 may transmit the UL communication triggered by the DL slot/subframe received at 710. The TN BS 706 may receive the UL communication triggered by the DL slot/subframe transmitted at 710. The UE 702 may transmit the UL communication in the $Y_{UL}$ 532 and 632, and the NTN BS 704 and the TN BS 706 may receive the UL communication in the $Y_{UL}$ 532 and 632.

Figure 8:
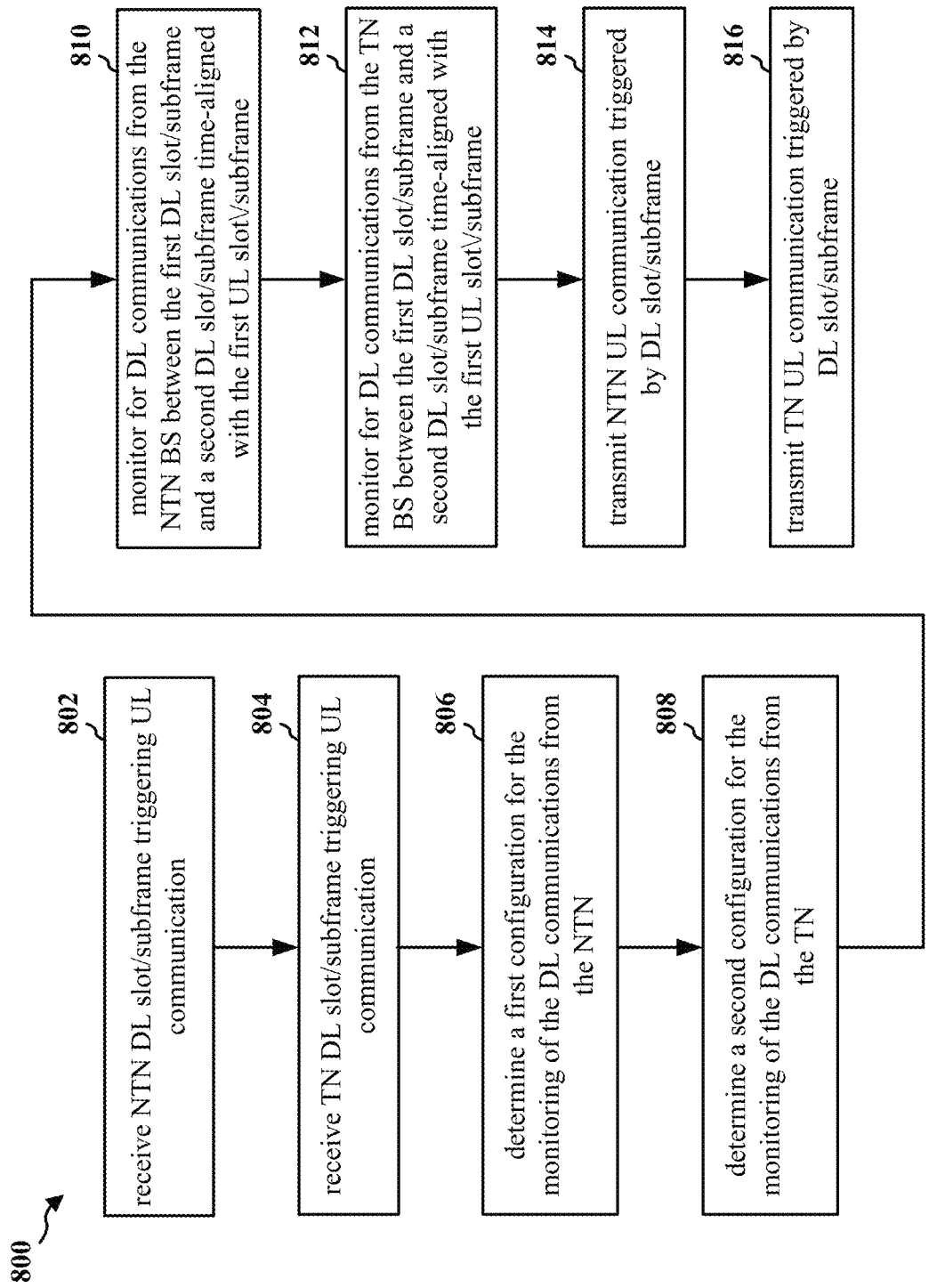
FIG. 8 is a flowchart of a method of wireless communication.

FIG. 8 is a flowchart 800 of a method of wireless communication. The method may be performed by a UE (e.g., the UE 104/702; the apparatus 1202). The UE may be scheduled, by an NTN BS, to receive DL transmission in the slots/subframes that the UE 702 is not configured to monitor due to the relatively large TA. Accordingly, the NTN BS 704 and the UE 702 may improve the overall throughput of the system.

At 802, the UE may receive a DL communication triggering a UL communication starting in a first UL slot/subframe from an NTN BS over DL slot/subframe ending in a first DL slot/subframe. For example, at 708, the UE 702 may receive a DL communication triggering a UL communication starting in a first UL slot/subframe from the NTN BS 704 over DL slot/subframe ending in a first DL slot/subframe. Furthermore, 802 may be performed by the DL managing component 1240.

At 804, the UE may receive a DL communication triggering a UL communication starting in a first UL slot/subframe from a TN BS over DL slot/subframe ending in a first DL slot/subframe. For example, at 710, the UE 702 may receive a DL communication triggering a UL communication starting in a first UL slot/subframe from the TN BS 706 over DL slot/subframe ending in a first DL slot/subframe. Furthermore, 804 may be performed by the DL managing component 1240.

The DL communications triggering the UL communication may include a PDCCH triggering a PUSCH, an RAR triggering the PUSCH, a PDCCH including a PDCCH order triggering a PRACH, or a PDCCH triggering a UCI over a PUCCH or a PUSCH. The PDCCH may include a DCI, the PDSCH may include data, and the PUCCH or PUSCH may include a HARQ-ACK based on the data. In one aspect, the wireless communication may be an NB-IoT communication, and the PDCCH may be an NPDCCH, the PUSCH may be an NPUSCH, and the PRACH may be an NPRACH. In another aspect, the wireless communication may be MTC, and the PDCCH may be an MPDCCH.

At 806, the UE may determine a first configuration for the monitoring of the DL communications from the NTN BS, the first configuration indicating at least the subset of the DL slots/subframes for the monitoring. In one aspect, the DL communication may trigger a second DL communication starting at a third DL slot/subframe and ending at a fourth DL slot/subframe, and the UL communication may be based at least in part on receiving the second DL communication. In such case, the subset of slots/subframes may be monitored between the fourth DL slot/subframe and the second DL slot/subframe. Referring again to FIG. 6, the third DL slot/subframe and the fourth DL slot/subframe may respectively refer to the DL slot/subframe N+K and N+M of the slots/subframes 646. For example, at 712, the UE 702 may determine a first configuration for the monitoring of the DL communications from the NTN BS 704, the first configuration indicating at least the subset of the DL slots/subframes for the monitoring. Furthermore, 806 may be performed by the DL managing component 1240.

At 808, the UE may determine a second configuration for the monitoring of the DL communications from the TN, the second configuration being different from the first configuration. For example, the second configuration may indicate a zero subset of the DL slots/subframes for monitoring. In one aspect, the second configuration may indicate a zero subset of the DL slots/subframes for monitoring. For example, at 714, the UE 702 may determine a second configuration for the monitoring of the DL communications from the TN BS 706, the second configuration being different from the first configuration. Furthermore, 808 may be performed by the DL managing component 1240.

At 810, the UE may monitor for the DL communications from the NTN BS in a subset of the DL slots/subframes between the first DL slot/subframe and the second DL slot/subframe that is time-aligned with the first UL slot/subframe, based on the first configuration for the monitoring of the DL communications from the NTN BS. For example, at 716, the UE 702 may monitor for the DL communications from the NTN BS 704 in a subset of the DL slots/subframes between the first DL slot/subframe and the second DL slot/subframe that is time-aligned with the first UL slot/subframe, based on the first configuration for the monitoring of the DL communications from the NTN BS 706. Furthermore, 810 may be performed by the DL managing component 1240.

At 812, the UE may monitor for the DL communications from the TN BS in a subset of the DL slots/subframes between the first DL slot/subframe and the second DL slot/subframe that is time-aligned with the first UL slot/subframe, based on the second configuration for the monitoring of the DL communications from the TN BS. In case the second configuration indicates the zero subset of the DL slots/subframes for monitoring, the UE does not monitor any DL slots/subframes between the first DL slot/subframe and the second DL slot/subframe that is time-aligned with the first UL slot/subframe. For example, at 718, the UE 702 may monitor for the DL communications from the TN BS 706 in a subset of the DL slots/subframes between the first DL slot/subframe and the second DL slot/subframe that is time-aligned with the first UL slot/subframe, based on the second configuration for the monitoring of the DL communications from the TN BS 706. Furthermore, 812 may be performed by the DL managing component 1240.

At 814, the UE may transmit the UL communication triggered by the DL slot/subframe received at 802. The UE 702 may transmit the UL communication in the $Y_{UL}$ 532 and 632. For example, at 720, the UE 702 may transmit the UL communication triggered by the DL slot/subframe received at 708. At 816, the UE may transmit the UL communication triggered by the DL slot/subframe received at 804. For example, at 722, the UE 702 may transmit the UL communication triggered by the DL slot/subframe received at 710. Furthermore, 814 and 816 may be performed by a UL managing component 1242.

Figure 9:
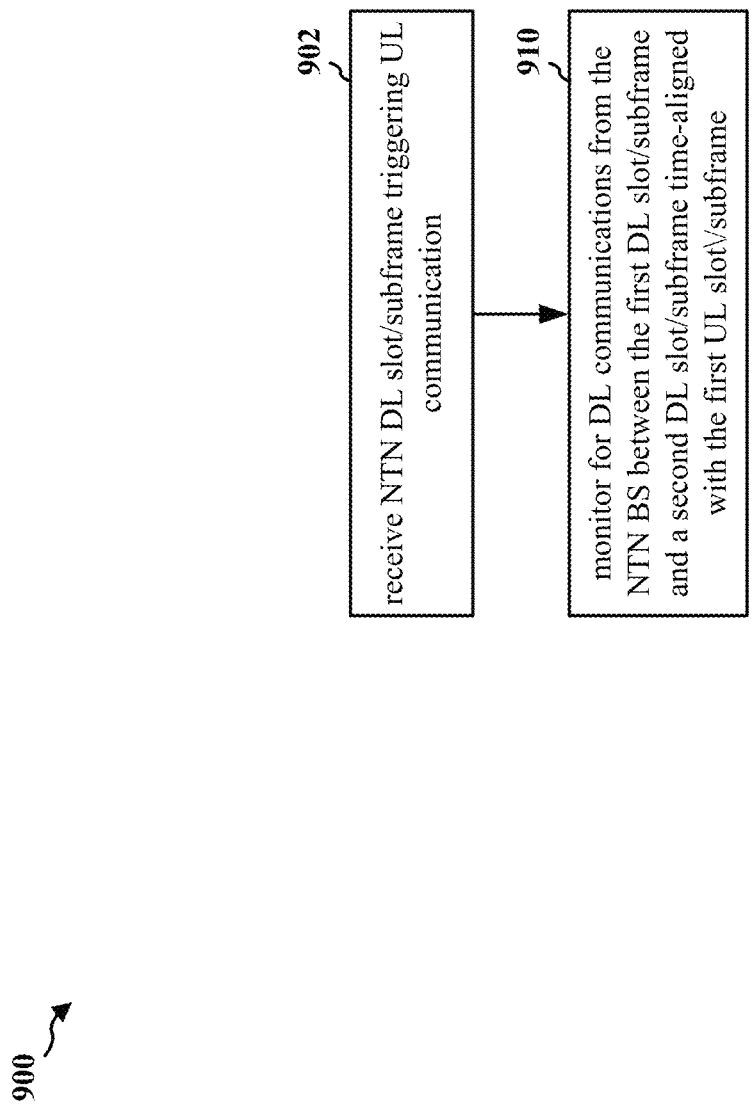
FIG. 9 is a flowchart of a method of wireless communication.

FIG. 9 is a flowchart 900 of a method of wireless communication. The method may be performed by a UE (e.g., the UE 104/702; the apparatus 1202). The UE may be scheduled, by an NTN BS, to receive DL transmission in the slots/subframes that the UE 702 is not configured to monitor due to the relatively large TA. Accordingly, the NTN BS 704 and the UE 702 may improve the overall throughput of the system.

At 902, the UE may receive a DL communication triggering a UL communication starting in a first UL slot/subframe from an NTN BS over DL slot/subframe ending in a first DL slot/subframe. For example, at 708, the UE 702 may receive a DL communication triggering a UL communication starting in a first UL slot/subframe from the NTN BS 704 over DL slot/subframe ending in a first DL slot/subframe. Furthermore, 902 may be performed by the DL managing component 1240.

The DL communications triggering the UL communication may include a PDCCH triggering a PUSCH, an RAR triggering the PUSCH, a PDCCH including a PDCCH order triggering a PRACH, or a PDCCH triggering a UCI over a PUCCH or a PUSCH. The PDCCH may include a DCI, the PDSCH may include data, and the PUCCH or PUSCH may include a HARQ-ACK based on the data. In one aspect, the wireless communication may be an NB-IoT communication, and the PDCCH may be an NPDCCH, the PUSCH may be an NPUSCH, and the PRACH may be an NPRACH. In another aspect, the wireless communication may be MTC, and the PDCCH may be an MPDCCH.

At 910, the UE may monitor for the DL communications from the NTN BS in a subset of the DL slots/subframes between the first DL slot/subframe and the second DL slot/subframe that is time-aligned with the first UL slot/subframe, based on the first configuration for the monitoring of the DL communications from the NTN BS. For example, at 716, the UE 702 may monitor for the DL communications from the NTN BS 704 in a subset of the DL slots/subframes between the first DL slot/subframe and the second DL slot/subframe that is time-aligned with the first UL slot/subframe, based on the first configuration for the monitoring of the DL communications from the NTN BS 706. Furthermore, 910 may be performed by the DL managing component 1240.

Figure 10:
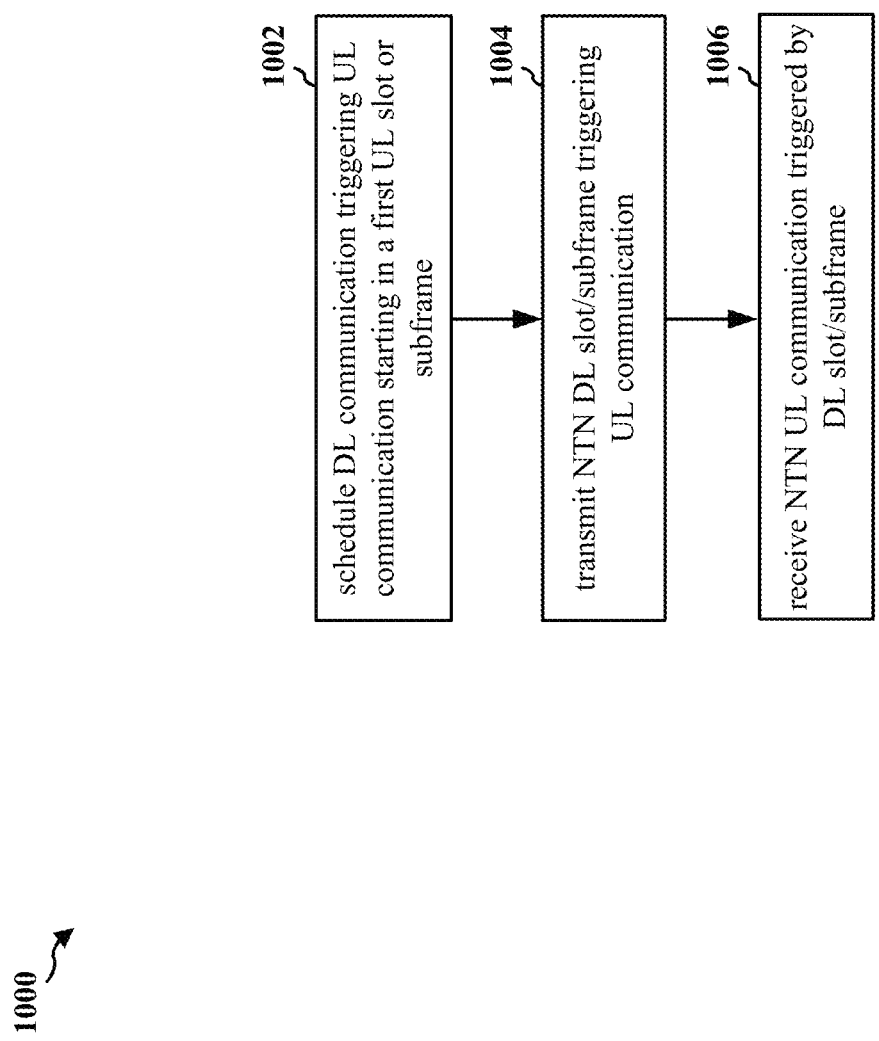
FIG. 10 is a flowchart of a method of wireless communication.

FIG. 10 is a flowchart 1000 of a method of wireless communication. The method may be performed by a base station (e.g., the base station 102/180/704; the apparatus 1302). The base station may be an NTN BS. In some aspects, the NTN BS may be configured to schedule DL transmission within slots/subframes that the UE is not configured to monitor due to the relatively large TA, and the UE may be scheduled, by the NTN BS, to receive DL transmission in the slots/subframes that the UE is not configured to monitor due to the relatively large TA. Accordingly, the NTN BS and the UE may improve the overall throughput of the system.

At 1002, the base station may schedule a DL communication triggering a UL communication starting in a first UL slot or subframe. For example, at 707, the NTN BS 704 may schedule a DL communication triggering a UL communication starting in a first UL slot or subframe. Furthermore, 1002 may be performed by a DL managing component 1340.

At 1004, the base station may transmit, to the UE, over at least one DL slot or subframe ending in a first DL slot or subframe, the DL communication triggering the UL communication starting in the first UL slot or subframe. The DL communications triggering the UL communication may include a PDCCH triggering a PUSCH, an RAR triggering the PUSCH, a PDCCH including a PDCCH order triggering a PRACH, or a PDCCH triggering a UCI over a PUCCH or a PUSCH. The PDCCH may include a DCI, the PDSCH may include data, and the PUCCH or PUSCH may include a HARQ-ACK based on the data. In one aspect, the wireless communication may be an NB-IoT communication, and the PDCCH may be an NPDCCH, the PUSCH may be an NPUSCH, and the PRACH may be an NPRACH. In another aspect, the wireless communication may be MTC, and the PDCCH may be an MPDCCH. For example, at 708, the NTN BS 704 may transmit, to the UE 702, over at least one DL slot or subframe ending in a first DL slot or subframe, the DL communication triggering the UL communication starting in the first UL slot or subframe. Furthermore, 1004 may be performed by the DL managing component 1340.

At 1006, the base station may receive the UL communication triggered by the DL slot/subframe transmitted at 1002. The base station may receive the UL communication in the $Y_{UL}$ 532 and 632. For example, at 720, the NTN BS 704 may receive the UL communication triggered by the DL slot/subframe transmitted at 708. Furthermore, 1006 may be performed by a UL managing component 1342.

Figure 11:
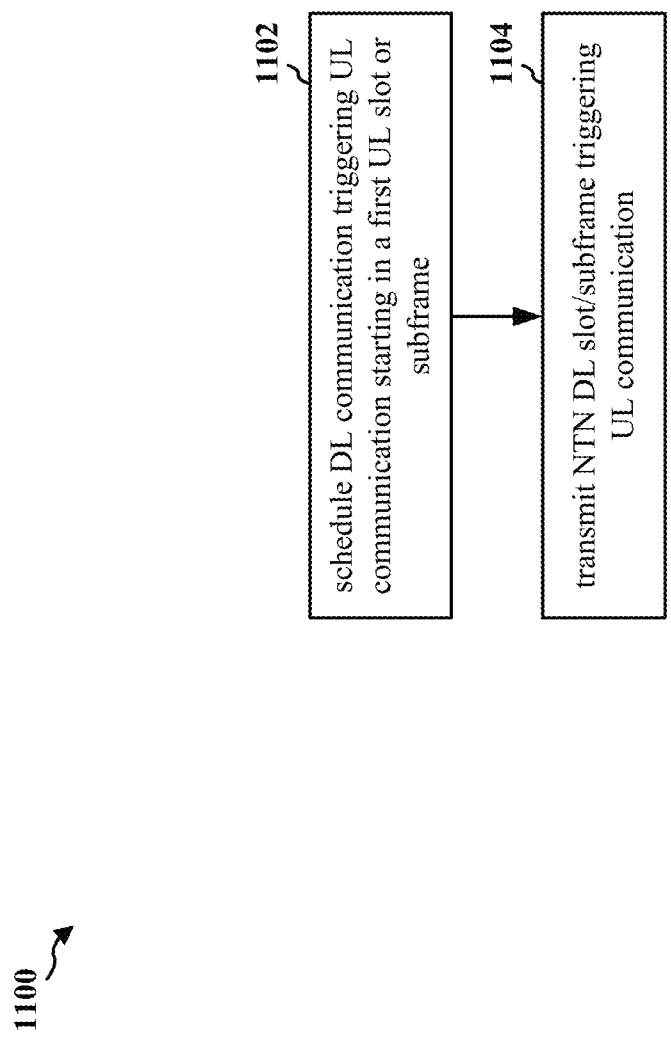
FIG. 11 is a flowchart of a method of wireless communication.

FIG. 11 is a flowchart 1100 of a method of wireless communication. The method may be performed by a base station (e.g., the base station 102/180/704; the apparatus 1302). The base station may be an NTN BS. In some aspects, the NTN BS may be configured to schedule DL transmission within slots/subframes that the UE is not configured to monitor due to the relatively large TA, and the UE may be scheduled, by the NTN BS, to receive DL transmission in the slots/subframes that the UE is not configured to monitor due to the relatively large TA. Accordingly, the NTN BS and the UE may improve the overall throughput of the system.

At 1102, the base station may schedule a DL communication triggering a UL communication starting in a first UL slot or subframe. For example, at 707, the NTN BS 704 may schedule a DL communication triggering a UL communication starting in a first UL slot or subframe. Furthermore, 1102 may be performed by a DL managing component 1340.

At 1104, the base station may transmit, to the UE, over at least one DL slot or subframe ending in a first DL slot or subframe, the DL communication triggering the UL communication starting in the first UL slot or subframe. The DL communications triggering the UL communication may include a PDCCH triggering a PUSCH, an RAR triggering the PUSCH, a PDCCH including a PDCCH order triggering a PRACH, or a PDCCH triggering a UCI over a PUCCH or a PUSCH. The PDCCH may include a DCI, the PDSCH may include data, and the PUCCH or PUSCH may include a HARQ-ACK based on the data. In one aspect, the wireless communication may be an NB-IoT communication, and the PDCCH may be an NPDCCH, the PUSCH may be an NPUSCH, and the PRACH may be an NPRACH. In another aspect, the wireless communication may be MTC, and the PDCCH may be an MPDCCH. For example, at 708, the NTN BS 704 may transmit, to the UE 702, over at least one DL slot or subframe ending in a first DL slot or subframe, the DL communication triggering the UL communication starting in the first UL slot or subframe. Furthermore, 1104 may be performed by the DL managing component 1340.

Figure 12:
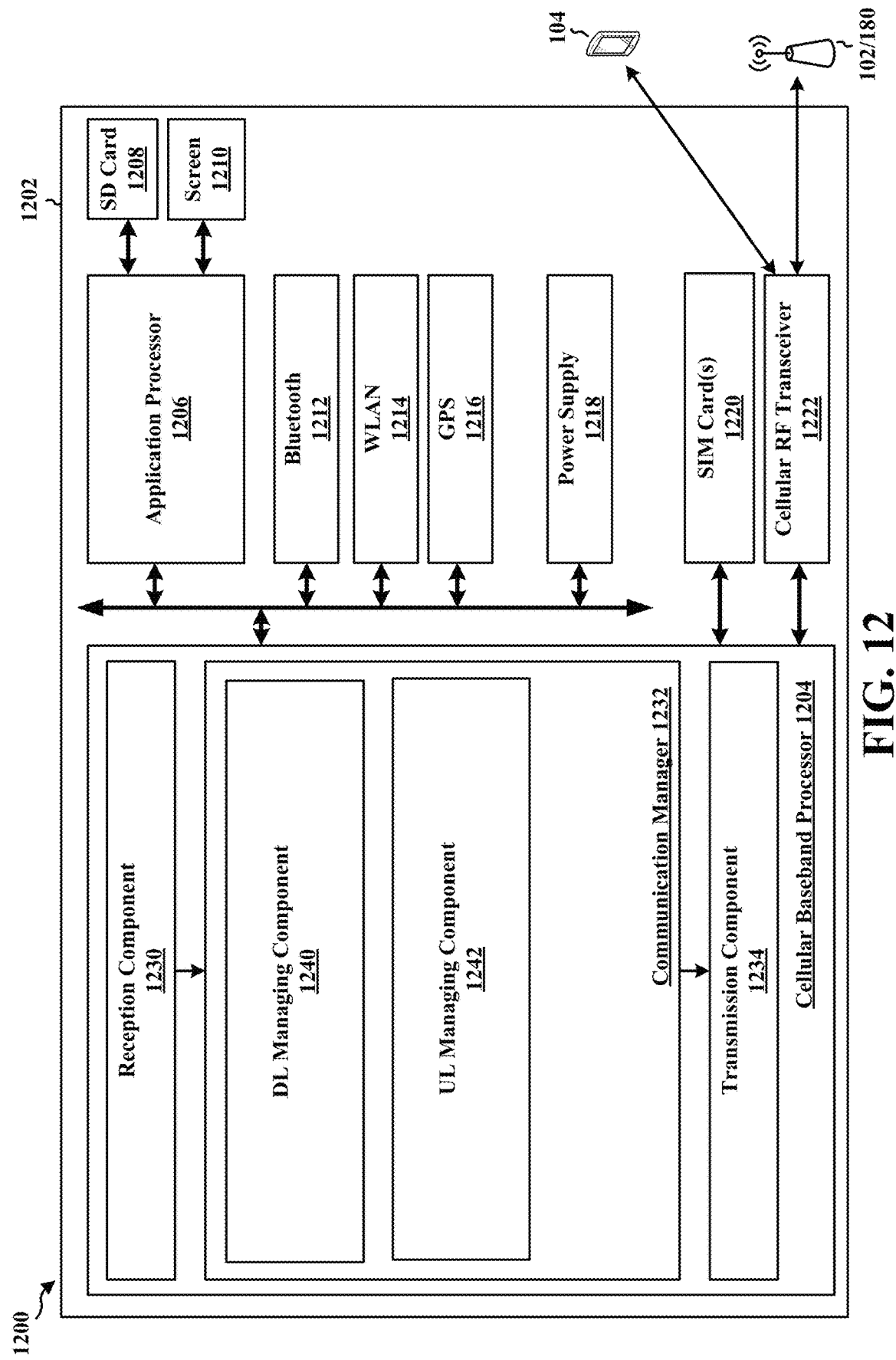
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include the baseband processor 1204, and in another configuration, the apparatus 1202 may be the entire UE (e.g., see 350 of FIG. 3) and include the aforediscussed additional modules of the apparatus 1202.

The communication manager 1232 includes a DL managing component 1240 that is configured to receive a DL communication triggering a UL communication starting in a first UL slot/subframe from an NTN B S or a TN B S over DL slot/subframe ending in a first DL slot/subframe, determine a first configuration for the monitoring of the DL communications from the NTN or the TN, and monitor for the DL communications from the NTN B S or the TN BS in a subset of the DL slots/subframes between the first DL slot/subframe and the second DL slot/subframe that is time-aligned with the first UL slot/subframe, e.g., as described in connection with 802, 804, 806, 808, 810, 812, 902, and 910. The communication manager 1232 further includes a UL managing component 1242 that is configured to transmit the UL communication triggered by the DL slot/subframe in the NTN or TN, e.g., as described in connection with 814 and 816. The DL managing component 1240 and the UL managing component 1242 may be configured to communicate with each other.

The apparatus may include additional components that perform each of the blocks of the algorithm in the aforementioned flowchart of FIGS. 7, 8, and 9. As such, each block in the aforementioned flowchart of FIGS. 7, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from an NTN BS over at least one DL slot or subframe ending in a first DL slot or subframe, a DL communication triggering a UL communication starting in a first UL slot or subframe, and means for monitoring for DL communications from the NTN BS in at least a subset of DL slots or subframes between the first DL slot or subframe and a second DL slot or subframe that is time-aligned with the first UL slot or subframe. The apparatus 1202 includes means for determining a first configuration for the monitoring of the DL communications from the NTN, the first configuration indicating at least the subset of the DL slots or subframes for the monitoring, and means for determining a second configuration for the monitoring of the DL communications from a TN. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
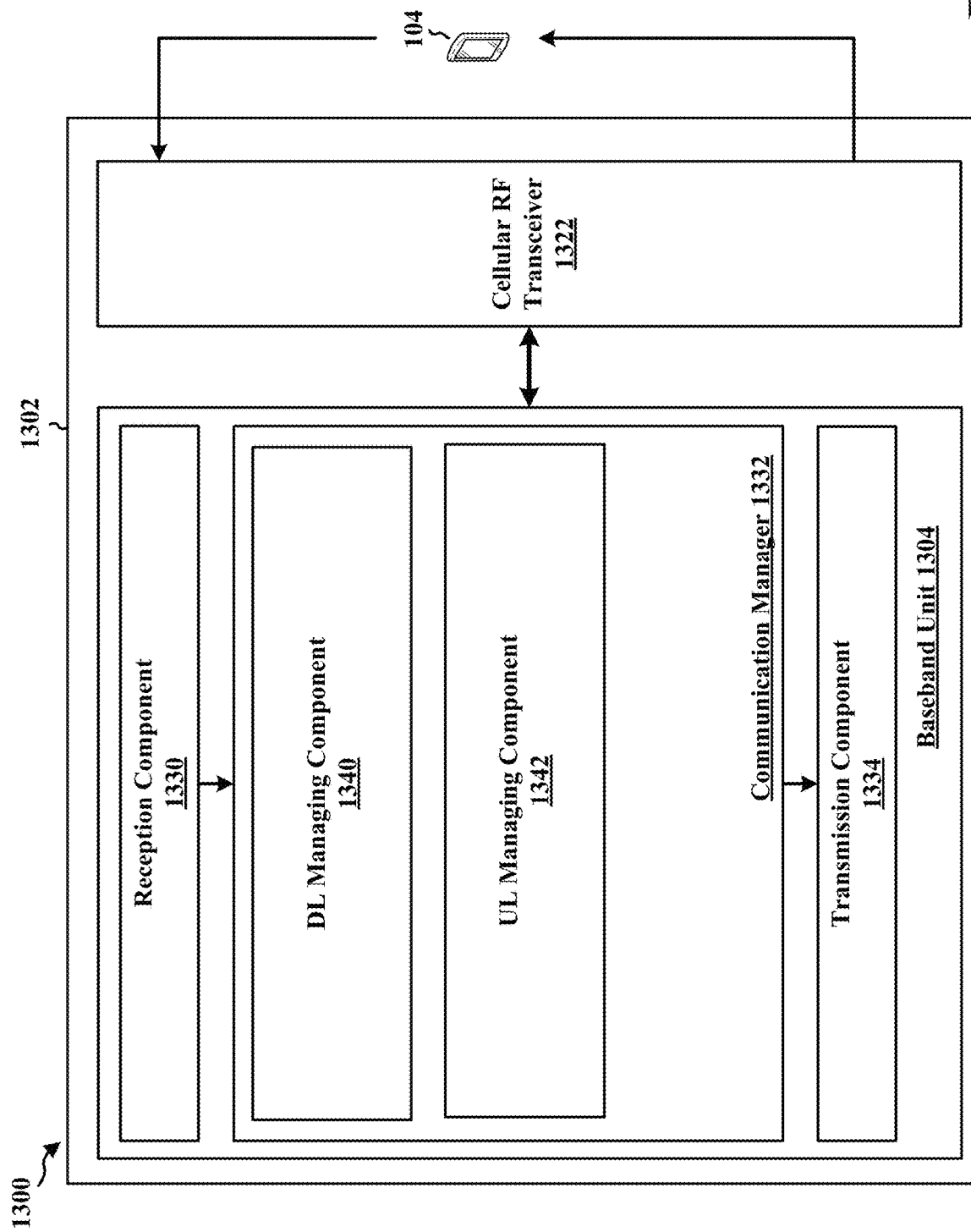
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1302 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a DL managing component 1340 that is configured to schedule a DL communication triggering a UL communication starting in a first UL slot or subframe, and transmit, to the UE, over at least one DL slot or subframe ending in a first DL slot or subframe, the DL communication triggering the UL communication starting in the first UL slot or subframe, e.g., as described in connection with 1002, 1004, 1102, and 1104. The communication manager 1332 further includes a UL managing component 1342 that is configured to receive the UL communication triggered by the DL slot/subframe transmitted to the UE, e.g., as described in connection with 1006.

The apparatus may include additional components that perform each of the blocks of the algorithm in the flowcharts of FIGS. 7, 10, and 11. As such, each block in the flowcharts of FIGS. 7, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for scheduling a DL communication triggering an UL communication starting in a first UL slot or subframe, means for transmitting, to a UE over at least one DL slot or subframe ending in a first DL slot or subframe, the DL communication triggering the UL communication starting in the first UL slot or subframe, and means for receiving the UL communication starting in the first UL slot or subframe, the UL communication triggered by the DL communication. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

The method and apparatus of a method of wireless communication may include a base station and a UE. The base station may include an NTN B S. In some aspects, the NTN BS may be configured to schedule DL transmission within slots/subframes that the UE is not configured to monitor due to the relatively large TA, and the UE may be scheduled, by the NTN B S, to receive DL transmission in the slots/subframes that the UE is not configured to monitor due to the relatively large TA. Accordingly, the NTN BS and the UE may improve the overall throughput of the system.

The UE may receive a DL communication triggering a UL communication starting in a first UL slot/subframe from an NTN BS over at least one DL slot/subframe ending in a first DL slot/subframe. The UE may monitor for DL communications from the NTN BS in at least a subset of DL slots/subframes between the first DL slot/subframe and a second DL slot/subframe that is time-aligned with the first UL slot/subframe. The DL communication may trigger a second DL communication starting at a third DL slot/subframe and ending at a fourth DL slot/subframe, and the UL communication is based at least in part on receiving the second DL communication, and the UE may monitor the at least the subset of slots/subframes between the fourth DL slot/subframe and the second DL slot/subframe.

The DL communication triggering the UL communication may be a PDCCH triggering a PUSCH, an RAR triggering the PUSCH, a PDCCH including a PDCCH order, triggering a PRACH, or a PDCCH triggering UCI over a PUCCH or over a PUSCH. The PDCCH may include DCI, the PDSCH may include data, and the PUCCH or PUSCH may include a HARQ-ACK based on the data.

In one example, the wireless communication may be an NB-IoT communication, and the PDCCH may be an NPDCCH, the PUSCH may be an NPUSCH, and the PRACH may be an NPRACH. In another example, the wireless communication may be an MTC, and the PDCCH is an MPDCCH.

Accordingly, the UE in NTN with the relatively large timing advance and the $K_{offset}$ may be scheduled to monitor for another DL transmission during at least a part of the time that the UE may be waiting to transmit the UL transmission to reduce loss of throughput in the NTN. The UE may store the UL communications in the UL transmission buffer, and monitor for the DL communication during at least a part of this "waiting time." If the UE detects and receives another DL communication from the NTN, the UE may process the newly received DL communication, while the previous UL communication stored in the UL transmission buffer may be timely transmitted to the NTN. Accordingly, the UE in NTN may reduce the throughput loss from the relatively large timing advance and $K_{offset}$.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory, the at least one processor and the memory configured to receive, from an NTN base station over at least one DL slot or subframe ending in a first DL slot or subframe, a DL communication triggering a UL communication starting in a first UL slot or subframe, and monitor for DL communications from the NTN base station in at least a subset of DL slots or subframes between the first DL slot or subframe and a second DL slot or subframe that is time-aligned with the first UL slot or subframe.

Aspect 2 is the apparatus of aspect 1, where the DL communication triggering the UL communication includes at least one of a PDCCH triggering a PUSCH, a RAR triggering the PUSCH, a PDCCH including a PDCCH order, triggering a PRACH, or a PDCCH triggering UCI over a PUCCH or over a PUSCH.

Aspect 3 is the apparatus of aspects 1 and 2, where the wireless communication is a NB-IoT communication, the PDCCH is a NPDCCH, the PUSCH is a NPUSCH, and the PRACH is a NPRACH.

Aspect 4 is the apparatus of any of aspects 1 to 3, where the wireless communication is MTC, and the PDCCH is an MPDCCH.

Aspect 5 is the apparatus of any of aspects 1 to 4, where the DL communication triggers a second DL communication starting at a third DL slot or subframe and ending at a fourth DL slot or subframe, and the UL communication is based at least in part on receiving the second DL communication, where the at least a subset of DL slots or subframes is monitored between the fourth DL slot or subframe and the second DL slot or subframe, and an index of the third DL slot or subframe is greater than an index of the first DL slot or subframe, and an index of the fourth DL slot or subframe is smaller than an index of the second DL slot or subframe.

Aspect 6 is the apparatus of aspect 5, where the DL communication includes a DL communication over a PDCCH, the second DL communication includes a DL communication over a PDSCH, and the UL communication includes UL communication through a PUCCH or a PUSCH.

Aspect 7 is the apparatus of aspect 6, where the PDCCH includes DCI, the PDSCH includes data, and the PUCCH or PUSCH includes a HARQ-ACK based on the data.

Aspect 8 is the apparatus of aspect 7, where the wireless communication is a NB-IoT communication, the PDCCH is a NPDCCH, and the PUSCH is a NPUSCHs.

Aspect 9 is the apparatus of any of aspects 1 to 8, where an index of the first UL slot or subframe is larger than the index of the first DL slot or subframe by a quantity of slots or subframes based at least in part on a scheduling offset associated with the NTN base station.

Aspect 10 is the apparatus of any of aspects 1 to 9, where an index of the second DL slot or subframe is smaller than the index of the first UL slot or subframe by a quantity of slots or subframes based at least in part on a timing advance parameter.

Aspect 11 is the apparatus of any of aspects 1 to 10, where the triggered UL communication is associated with a first HARQ process, and the monitored DL communications is associated with a same first HARQ process.

Aspect 12 is the apparatus of any of aspects 1 to 11, where the at least one processor and the memory monitoring for DL communications are configured to monitor for a PDCCH.

Aspect 13 is the apparatus of any of aspect 12, where the wireless communication is a NB-IoT communication, and the PDCCH is a NPDCCH.

Aspect 14 is the apparatus of any of aspects 1 to 13, where the at least one processor and the memory are further configured to determine a first configuration for the monitoring of the DL communications from the NTN base station, the first configuration indicating at least the subset of the DL slots or subframes for the monitoring, and determine a second configuration for the monitoring of the DL communications from a TN base station, where the first configuration and the second configuration are different from each other.

Aspect 15 is the apparatus of aspect 14, where the second configuration indicates a different subset of the DL slots or subframes for the monitoring.

Aspect 16 is the apparatus of any of aspects 1 to 15, further including a transceiver coupled to the at least one processor.

Aspect 17 is a method of wireless communication for implementing any of aspects 1 to 16.

Aspect 18 is an apparatus for wireless communication including means for implementing any of aspects 1 to 16.

Aspect 19 is a computer-readable medium storing computer executable code, where the code when executed by a processor causes the processor to implement any of aspects 1 to 16.

Aspect 20 is an apparatus for wireless communication at a base station including at least one processor coupled to a memory and configured to schedule a DL communication triggering a UL communication starting in a first UL slot or subframe, and transmit, to a UE over at least one DL slot or subframe ending in a first DL slot or subframe, the DL communication triggering the UL communication starting in the first UL slot or subframe, where the DL communication is transmitted in at least a subset of DL slots or subframes between the first DL slot or subframe and a second DL slot or subframe that is time-aligned with the first UL slot or subframe.

Aspect 21 is the apparatus of aspect 20, where the DL communication triggering the UL communication includes at least one of a PDCCH triggering a PUSCH, a RAR triggering the PUSCH, a PDCCH including a PDCCH order, triggering a PRACH, or a PDCCH triggering UCI over a PUCCH or over a PUSCH.

Aspect 22 is the apparatus of aspects 20 and 21, where the wireless communication is a NB-IoT communication, the PDCCH is a NPDCCH, the PUSCH is a NPUSCH, and the PRACH is a NPRACH.

Aspect 23 is the apparatus of any of aspects 20 to 22, where the wireless communication is MTC, and the PDCCH is an MPDCCH.

Aspect 24 is the apparatus of any of aspects 20 to 23, where the DL communication triggers a second DL communication starting at a third DL slot or subframe and ending at a fourth DL slot or subframe, and the UL communication is based at least in part on receiving the second DL communication, where the at least the subset of DL slots or subframes is transmitted between the fourth DL slot or subframe and the second DL slot or subframe, and where an index of the third DL slot or subframe is greater than an index of the first DL slot or subframe, and an index of the fourth DL slot or subframe is smaller than an index of the second DL slot or subframe.

Aspect 25 is the apparatus of aspect 24, where the DL communication includes a DL communication over a PDCCH, the second DL communication includes a DL communication over a PDSCH, and the UL communication includes UL communication through a PUCCH or a PUSCH.

Aspect 26 is the apparatus of aspect 25, where the PDCCH includes DCI, the PDSCH includes data, and the PUCCH or PUSCH includes a HARQ-ACK based on the data.

Aspect 27 is the apparatus of aspect 26, where the wireless communication is a NB-IoT communication, the PDCCH is a NPDCCH, and the PUSCH is a NPUSCH.

Aspect 28 is the apparatus of any of aspects 20 to 27, where an index of the first UL slot or subframe is larger than an index of the first DL slot or subframe by a quantity of slots or subframes based at least in part on a scheduling offset associated with an NTN base station.

Aspect 29 is the apparatus of any of aspects 20 to 28, where an index of the second DL slot or subframe is smaller than an index of the first UL slot or subframe by a quantity of slots or subframes based at least in part on a timing advance parameter.

Aspect 30 is the apparatus of any of aspects 21 to 29, where the wireless communication is a NB-IoT communication, and the PDCCH is a NPDCCH.

Aspect 31 is the apparatus of any of aspects 20 to 30, further including a transceiver coupled to the at least one processor.

Aspect 32 is a method of wireless communication for implementing any of aspects 20 to 31.

Aspect 33 is an apparatus for wireless communication including means for implementing any of aspects 20 to 31.

Aspect 34 is a computer-readable medium storing computer executable code, where the code when executed by a processor causes the processor to implement any of aspects 20 to 31.

What is claimed is:

1. An apparatus for wireless communication at a user equipment (UE), comprising:
   memory; and
   at least one processor coupled to the memory, the at least one processor and the memory configured to:
      receive, from a non-terrestrial network (NTN) base station (BS) in a first downlink (DL) slot or subframe, a DL communication configured to trigger an uplink (UL) communication starting in a first UL slot or subframe; and
      monitor for other DL communications from the NTN BS in at least a subset of DL slots or subframes between the first DL slot or subframe and a second DL slot or subframe that is time-aligned with the first UL slot or subframe based on the DL communication being from the NTN base station.

2. The apparatus of claim 1, further comprising a transceiver coupled to the at least one processor, wherein the DL communication configured to trigger the UL communication comprises at least one of:
   a physical downlink control channel (PDCCH) configured to trigger a physical uplink shared channel (PUSCH),
   a random access response (RAR) configured to trigger the PUSCH,
   a PDCCH comprising a PDCCH order, configured to trigger a physical random access channel (PRACH), or a PDCCH configured to trigger uplink control information (UCI) over a physical uplink control channel (PUCCH) or over the PUSCH.

3. The apparatus of claim 2, wherein the wireless communication is a narrowband internet-of-things (NB-IoT) communication, the PDCCH is a narrowband PDCCH (NPDCCH), the PUSCH is a narrowband PUSCH (NPUSCH), and the PRACH is a narrowband PRACH (NPRACH).

4. The apparatus of claim 2, wherein the wireless communication is machine-type communication (MTC), and the PDCCH is an MTC PDCCH (MPDCCH).

5. The apparatus of claim 1, wherein the DL communication is configured to trigger a second DL communication starting at a third DL slot or subframe and ending at a fourth DL slot or subframe, and the UL communication is based at least in part on a reception of the second DL communication, wherein the at least one processor and the memory are configured to monitor the at least a subset of DL slots or subframes between the fourth DL slot or subframe and the second DL slot or subframe,
wherein an index of the third DL slot or subframe is greater than an index of the first DL slot or subframe, and an index of the fourth DL slot or subframe is smaller than an index of the second DL slot or subframe.

6. The apparatus of claim 5, wherein the DL communication comprises a DL communication over a physical downlink control channel (PDCCH), the second DL communication comprises a DL communication over a physical downlink shared channel (PDSCH), and the UL communication comprises UL communication through a physical uplink control channel (PUCCH) or a physical uplink shared channel (PUSCH).

7. The apparatus of claim 6, wherein the PDCCH comprises downlink control information (DCI), the PDSCH comprises data, and the PUCCH or PUSCH comprises a hybrid automatic repeat request (HARQ) Acknowledgment (ACK) (HARQ-ACK) based on the data.

8. The apparatus of claim 7, wherein the wireless communication is a narrowband internet-of-things (NB-IoT) communication, the PDCCH is a narrowband PDCCH (NPDCCH), and the PUSCH is a narrowband PUSCH (NPUSCH).

9. The apparatus of claim 1, wherein an index of the first UL slot or subframe is larger than the index of the first DL slot or subframe by a quantity of slots or subframes based at least in part on a scheduling offset associated with the NTN BS.

10. The apparatus of claim 1, wherein an index of the second DL slot or subframe is smaller than the index of the first UL slot or subframe by a quantity of slots or subframes based at least in part on a timing advance parameter.

11. The apparatus of claim 1, wherein the triggered UL communication is associated with a first hybrid automatic repeat request (HARQ) process, and the monitored other DL communications is associated with a same first HARQ process.

12. The apparatus of claim 1, wherein to monitor for the other DL communications, the at least one processor and the memory are configured to monitor for a physical downlink control channel (PDCCH).

13. The apparatus of claim 12, wherein the wireless communication is a narrowband internet-of-things (NB-IoT) communication, and the PDCCH is a narrowband PDCCH (NPDCCH).

14. The apparatus of claim 1, wherein the at least one processor and the memory are further configured to:
determine a first configuration for the monitoring of the other DL communications from the NTN BS, the first configuration indicating at least the subset of the DL slots or subframes for the monitoring; and
determine a second configuration for the monitoring of the other DL communications from a terrestrial network (TN),
wherein the first configuration and the second configuration are different from each other.

15. The apparatus of claim 14, wherein the second configuration indicates a different subset of the DL slots or subframes for the monitoring.

16. A method of wireless communication at a user equipment (UE), comprising:
receiving, from a non-terrestrial network (NTN) base station (BS) in a first downlink (DL) slot or subframe, a downlink (DL) communication triggering an uplink (UL) communication starting in a first UL slot or subframe; and
monitoring for other DL communications from the NTN BS in at least a subset of DL slots or subframes between the first DL slot or subframe and a second DL slot or subframe that is time-aligned with the first UL slot or subframe based on the DL communication being based on NTN.

17. The method of claim 16, further comprising:
determining a first configuration for the monitoring of the other DL communications from the NTN BS, the first configuration indicating at least the subset of the DL slots or subframes for the monitoring; and
determining a second configuration for the monitoring of the other DL communications from a terrestrial network (TN) BS,
wherein the first configuration and the second configuration are different from each other.

18. An apparatus for wireless communication at a non-terrestrial network (NTN) base station (BS), comprising:
memory; and
at least one processor coupled to the memory, the at least one processor and the memory configured to:
schedule a downlink (DL) communication configured to trigger an uplink (UL) communication starting in a first UL slot or subframe; and
transmit, to a user equipment (UE) in a first downlink (DL) slot or subframe, the DL communication configured to trigger the UL communication starting in the first UL slot or subframe,
wherein the at least one processor and the memory is configured to transmit other DL communications in at least a subset of DL slots or subframes between the first DL slot or subframe and a second DL slot or subframe that is time-aligned with the first UL slot or subframe at the UE based on the DL communication being from the NTN base station.

19. The apparatus of claim 18, further comprising a transceiver coupled to the at least one processor, wherein the DL communication configured to trigger the UL communication comprises at least one of:
a physical downlink control channel (PDCCH) configured to trigger a physical uplink shared channel (PUSCH),
a random access response (RAR) configured to trigger the PUSCH,
a PDCCH comprising a PDCCH order, configured to trigger a physical random access channel (PRACH), or a PDCCH configured to trigger uplink control information (UCI) over a physical uplink control channel (PUCCH) or over the PUSCH.

20. The apparatus of claim 19, wherein the wireless communication is a narrowband internet-of-things (NB-IoT) communication, the PDCCH is a narrowband PDCCH (NPDCCH), the PUSCH is a narrowband PUSCH (NPUSCH), and the PRACH is a narrowband PRACH (NPRACH).

21. The apparatus of claim 19, wherein the wireless communication is machine-type communication (MTC), and the PDCCH is an MTC PDCCH (MPDCCH).

22. The apparatus of claim 19, wherein the wireless communication is a narrowband internet-of-things (NB-IoT) communication, and the PDCCH is a narrowband PDCCH (NPDCCH).

23. The apparatus of claim 18, wherein the DL communication is configured to trigger a second DL communication starting at a third DL slot or subframe and ending at a fourth DL slot or subframe, and the UL communication is based at least in part on a reception of the second DL communication, wherein the at least one processor and the memory are configured to transmit the at least the subset of DL slots or subframes between the fourth DL slot or subframe and the second DL slot or subframe,
wherein an index of the third DL slot or subframe is greater than an index of the first DL slot or subframe, and an index of the fourth DL slot or subframe is smaller than an index of the second DL slot or subframe.

24. The apparatus of claim 23, wherein the DL communication comprises a DL communication over a physical downlink control channel (PDCCH), the second DL communication comprises a DL communication over a physical downlink shared channel (PDSCH), and the UL communication comprises UL communication through a physical uplink control channel (PUCCH) or a physical uplink shared channel (PUSCH).

25. The apparatus of claim 24, wherein the PDCCH comprises downlink control information (DCI), the PDSCH comprises data, and the PUCCH or PUSCH comprises a hybrid automatic repeat request (HARQ) Acknowledgment (ACK) (HARQ-ACK) based on the data.

26. The apparatus of claim 25, wherein the wireless communication is a narrowband internet-of-things (NB-IoT) communication, the PDCCH is a narrowband PDCCH (NPDCCH), and the PUSCH is a narrowband PUSCH (NPUSCH).

27. The apparatus of claim 18, wherein an index of the first UL slot or subframe is larger than an index of the first DL slot or subframe by a quantity of slots or subframes based at least in part on a scheduling offset associated with a non-terrestrial network (NTN) BS.

28. The apparatus of claim 18, wherein an index of the second DL slot or subframe is smaller than an index of the first UL slot or subframe by a quantity of slots or subframes based at least in part on a timing advance parameter.

29. A method of wireless communication at a non-terrestrial network (NTN) base station (BS), comprising:
scheduling a downlink (DL) communication triggering an uplink (UL) communication starting in a first UL slot or subframe; and
transmitting, to a user equipment (UE) in a first downlink (DL) slot or subframe, the downlink (DL) communication triggering the UL communication starting in the first UL slot or subframe,
wherein other DL communications are transmitted in at least a subset of DL slots or subframes between the first DL slot or subframe and a second DL slot or subframe that is time-aligned with the first UL slot or subframe at the UE based on the DL communication being from the NTN base station.

30. The method of claim 29, further comprising receiving the UL communication starting in the first UL slot or subframe, the UL communication triggered by the DL communication.

* * * * *